United States Patent
Yu

(10) Patent No.: US 10,620,431 B2
(45) Date of Patent: Apr. 14, 2020

(54) SYSTEM, METHOD AND COMPUTER-ACCESSIBLE MEDIUM FOR DEPTH OF FIELD IMAGING FOR THREE-DIMENSIONAL SENSING UTILIZING A SPATIAL LIGHT MODULATOR MICROSCOPE ARRANGEMENT

(71) Applicant: THE TRUSTEES OF COLUMBIA UNIVERSITY IN THE CITY OF NEW YORK, New York, NY (US)

(72) Inventor: Nanfang Yu, New York, NY (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 812 days.

(21) Appl. No.: 14/763,925

(22) PCT Filed: Jan. 30, 2014

(86) PCT No.: PCT/US2014/013892
§ 371 (c)(1),
(2) Date: Jul. 28, 2015

(87) PCT Pub. No.: WO2014/171992
PCT Pub. Date: Oct. 23, 2014

(65) Prior Publication Data
US 2015/0369660 A1    Dec. 24, 2015

Related U.S. Application Data

(60) Provisional application No. 61/758,604, filed on Jan. 30, 2013.

(51) Int. Cl.
*G02B 27/00* (2006.01)
*H01Q 1/38* (2006.01)
(Continued)

(52) U.S. Cl.
CPC ......... *G02B 27/0075* (2013.01); *G02B 5/008* (2013.01); *G02B 21/0004* (2013.01);
(Continued)

(58) Field of Classification Search
CPC .... G02B 27/0075; G02B 21/00; G02B 5/008; G02B 6/1226; H01Q 1/38; H01Q 21/0087; H01Q 21/064
(Continued)

(56) References Cited

U.S. PATENT DOCUMENTS

| 5,589,845 A * | 12/1996 | Yandrofski | H01G 7/06 |
| | | | 333/161 |
| 5,739,796 A | 4/1998 | Jasper et al. | |

(Continued)

FOREIGN PATENT DOCUMENTS

| WO | WO 2011050272 A2 * | 4/2011 | ........... G01N 21/554 |
| WO | WO 2011162727 A1 * | 12/2011 | ............ B01J 21/185 |
| WO | WO 2012/078043 | 6/2012 | |

OTHER PUBLICATIONS

Peters, D.W. et al., "Metamaterial-inspired high-absorption surfaces for thermal infrared applications", 2010, Proc. SPIE vol. 7609, Photonic and Phononic Crystal Materials and Devices X, 76091C, pp. 76091C-1 to 76091C-7.*

(Continued)

*Primary Examiner* — David P Porta
*Assistant Examiner* — Blake C Riddick
(74) *Attorney, Agent, or Firm* — Hunton Andrews Kurth LLP

(57) ABSTRACT

Exemplary embodiment can utilize the properties of tunable thin-film, material (e.g., graphene) to efficiently modulate the intensity, phase, and/or polarization of transmitted and/or reflected radiation, including mid-infrared ("mid-IR") radiation. Exemplary embodiments include planar antennas com- (Continued)

prising tunable thin-film material sections and metallic sections disposed in contact with the tunable thin-film material sections, each metallic section having a gap with at least one dimension related to a wavelength of the radiation, which in some embodiments may be less than the wavelength. The metallic layer may comprise rods arrange in one or more shapes, or one or more apertures of one or more shapes. Embodiments of the antenna may also comprise a substrate, which may be a semiconductor or conductor in various embodiments. Embodiments also include systems, computer-implemented methods, devices, and computer-readable media for effectuating desired modulation of incident radiation by, e.g., varying the doping level of the tunable thin-film material.

25 Claims, 14 Drawing Sheets

(51) Int. Cl.
    H01Q 21/00        (2006.01)
    H01Q 21/06        (2006.01)
    G02F 1/015        (2006.01)
    G02B 21/00        (2006.01)
    G02B 5/00         (2006.01)

(52) U.S. Cl.
    CPC .............. *G02F 1/015* (2013.01); *H01Q 1/38* (2013.01); *H01Q 21/0087* (2013.01); *H01Q 21/064* (2013.01); *G02F 2203/10* (2013.01); *G02F 2203/11* (2013.01)

(58) Field of Classification Search
    USPC .......................................... 250/338.4, 338.1
    See application file for complete search history.

(56) References Cited

U.S. PATENT DOCUMENTS

| | | | |
|---|---|---|---|
| 6,274,293 B1 | 8/2001 | Gupta et al. | |
| 6,292,143 B1 | 9/2001 | Romanofsky | |
| 7,787,122 B2* | 8/2010 | Saito | G01J 11/00 356/432 |
| 8,452,134 B1* | 5/2013 | Davids | G01J 1/42 385/12 |
| 8,554,022 B1* | 10/2013 | Hochberg | H01L 29/66977 257/21 |
| 9,293,627 B1* | 3/2016 | Beechem, III | H01L 29/1606 |
| 2004/0095627 A1* | 5/2004 | Ahearn | B82Y 20/00 359/240 |
| 2006/0162766 A1* | 7/2006 | Gee | H01L 21/76898 136/256 |
| 2009/0212217 A1* | 8/2009 | Mann | G02B 7/1821 250/334 |
| 2010/0026590 A1 | 2/2010 | Chiang et al. | |
| 2010/0051897 A1* | 3/2010 | Chen | B82Y 10/00 257/9 |
| 2010/0051960 A1* | 3/2010 | Chen | H01L 29/1606 257/76 |
| 2010/0055388 A1* | 3/2010 | Chen | H01L 29/1606 428/119 |
| 2010/0244656 A1* | 9/2010 | Ito | H01Q 1/2283 313/358 |
| 2011/0001173 A1* | 1/2011 | Ojefors | H01L 23/66 257/290 |
| 2011/0006837 A1* | 1/2011 | Wang | H01L 29/1606 327/539 |
| 2011/0042650 A1* | 2/2011 | Avouris | H01L 29/1606 257/29 |
| 2011/0278459 A1* | 11/2011 | Hohl | G08B 3/10 250/340 |
| 2012/0153119 A1* | 6/2012 | Patil | B82Y 30/00 250/200 |
| 2012/0274934 A1* | 11/2012 | Messerschmidt | G01N 21/65 356/301 |
| 2013/0004658 A1* | 1/2013 | Yang | H01Q 1/368 427/122 |
| 2013/0015375 A1* | 1/2013 | Avouris | G02B 6/10 250/504 R |
| 2013/0102084 A1* | 4/2013 | Loh | B01J 21/185 436/94 |
| 2013/0148194 A1* | 6/2013 | Altug | G01N 21/554 359/350 |
| 2013/0163069 A1* | 6/2013 | Engheta | B82Y 20/00 359/298 |
| 2013/0193544 A1* | 8/2013 | Ozcan | B82Y 15/00 257/432 |
| 2013/0240734 A1* | 9/2013 | Booksh | G01N 21/553 250/339.11 |
| 2013/0342279 A1* | 12/2013 | Sensale-Rodriguez | H03C 7/00 332/179 |
| 2014/0017839 A1* | 1/2014 | Li | H01L 31/0352 438/36 |
| 2014/0056551 A1* | 2/2014 | Liu | G02F 1/025 385/2 |
| 2014/0085693 A1* | 3/2014 | Mosallaei | G02B 1/002 359/107 |
| 2014/0158987 A1* | 6/2014 | Song | H01Q 1/1271 257/29 |
| 2014/0319385 A1* | 10/2014 | Mikhailov | H01L 29/4238 250/493.1 |
| 2014/0346357 A1* | 11/2014 | Jarrahi | H01L 31/09 250/338.4 |
| 2015/0309218 A1* | 10/2015 | Shalaev | G02B 1/002 359/241 |
| 2015/0372159 A1* | 12/2015 | Englund | H01L 31/09 356/328 |
| 2016/0172527 A1* | 6/2016 | Beechem, III | H01L 31/0232 257/294 |

OTHER PUBLICATIONS

Ni, Z.H. et al., "Graphene Thickness Determination Using Reflection and Contrast Spectroscopy", American Chemical Society 7(9), pp. 2758-2763 (Year: 2007).*
B. H. Stuart, Infrared Spectroscopy: Fundamentals and Applications, Wiley, 2004.
R. F. Curl et al, "Quantum cascade lasers in chemical physics", Chem. Phys. Lett. 487, 1 (2010).
A. M. Tabirian et al, "Atmospheric propagation of novel MWIR laser output for emerging free-space applications", Proc. of SPIE 6951, 69510T (2008) .
Martini et al. "Free-space optical of multimedia satellite data streams using mid-infrared quantum cascade lasers", Electron. Lett. 38, 181 (2002).
Kosterev et al., "Thermoelectrically cooled quantum-cascade-laser-based sensor for the continuous monitoring of ambient atmospheric carbon monoxide" Appl. Opt. 41, 1169 (2002).
H. H. P. T. Bekman, J. C. van den Heuvel, F. J. M. van Putten, and R. Schleijpen, Proc. SPIE 5615, 27 (2004).
D. C. Fernandez et al, "Infrared spectroscopic imaging for histopathologic recognition", Nature Biotech. 23, 469 (2005).
C. Bauer et al., "Pulsed laser surface fragmentation and mid-infrared laser spectroscopy for remote detection of explosives", Appl. Phys. B 85, 251 (2006).
A. P. M. Michel et al, "Quantum cascade laser open-path system for remote sensing of trace gases in Beijing, China", Opt. Eng. 49, 111125 (2010).
Y. Yao et al., "Mid-infrared quantum cascade lasers", Nature Photon. 6, 432 (2012).
A. Rogalski, "Recent progress in infrared detector technologies" Infrared Phys. Technol. 54, 136 (2011).
S. D. Gunapala et al., "1024×1024 Format pixel co-located simultaneously readable dual-band QWIP focal plane", Infrared Phys. Technol. 52, 395 (2009).

(56) References Cited

OTHER PUBLICATIONS

A. Rogalski, "Progress in focal plane array technologies" Prog. Quant. Electron. 36, 342 (2012).
S.-H. Shim et al., "Femtosecond pulse shaping directly in the mid-IR using acousto-optic modulation", Opt. Lett. 31, 838 (2006).
P. Holmström, "High-speed mid-IR modulator using Stark shift in step quantum wells" IEEE J. Quant. Electron. 37, 1273 (2001).
A. Lyakh et al., "Tapered 4.7 μm quantum cascade lasers with highly strained active region composition . . . continuous wave optical power", Appl. Phys Lett. 92, 211108 (2008).
J. Teissier et al, "Integrated quantum cascade laser-modulator using vertically coupled cavities", Appl. Phys. Lett. 94, 211105 (2009).
F. H. L. Koppens et al., "Graphene plasmonics: A platform for strong light-matter interaction", Nano Lett. 11, 3370 (2011).
Z. Fei et al., "Gate-tuning of graphene plasmons revealed by infrared nano-imaging", Nature 487, 82 (2012).
J. Chen et al., "Optical nano-imaging of gate-tunable graphene plasmons", Nature 487, 77 (2012).
P. Bharadwaj et al., "Optical Antennas", Adv. Opt. Photon. 1, 438 (2009).
L. Novotny, and N. van Hulst, "Antennas for Light" Nature Photon. 5, 83 (2011).
N. Yu et al., "Light Propagation with Phase Discontinuities: Generalized Laws ofReflection and Refraction", Science 334, 333 (2011).
P. Genevet et al., "Ultra-thin plasmonic optical vortex plate based on phase Discontinuities", Appl. Phys. Lett. 100, 13101 (2012).
M. A. Kats et al., "Giant birefringence in optical antenna arrays with widely tailorable optical anisotropy", Proc. Nat. Acad. Sci. U.S.A. 109, 12364 (2012).
F. Aieta et al., "Aberration-free ultra-thin flat lenses and axicons at telecom wavelengths based on plasmonic metasurfaces", Nano Lett. 12, 4932 (2012).
N. Yu et al, "A Broadband, Background-Free Quarter-Wave Plate Based on Plasmonic Metasurfaces", Nano Lett. 12, 6328 (2012).
B. Memarzadeh, and H. Mosallaei, "Array of planar plasmonic scatterers functioning as light concentrator" Opt. Lett. 36, 2569 (2011).
X. Ni et al., "Broadband Light Bending with Plasmonic Nanoantennas" Science 335, 427 (2012).
S. Sun et al., "Gradient-index meta-surfaces as a bridge linking propagating waves and surface waves", Nature Mater. 11, 426 (2012).
S. Sun et al., "High-Efficiency Broadband Anomalous Reflection by Gradient Meta-Surfaces", Nano Lett. 12, 6223 (2012).
M. Kang et al., "Wave front engineering from an array of thin aperture antennas" Optics Exp. 20, 15882 (2012).
L. Huang et al, "Dispersionless Phase Discontinuities for Controlling Light Propagation", Nano Lett. 12, 5750 (2012).
K. S. Novoselov et al., "Electric field effect in atomically thin carbon films", Science 306, 666 (2004).
L. A. Falkovsky, and S. S. Pershoguba, "Optical far-infrared properties of a graphene monolayer and multilayer" Phys. Rev. B 76, 153410 (2007).
N. Petrone et al., "Chemical Vapor Deposition-Derived Graphene with Electrical Performance of Exfoliated Graphene", Nano Lett. 12, 2751 (2012).
A. Alù, and N. Engheta, "Tuning the scattering response of optical nanoantennas with nanocircuit loads" Nature Photon. 2, 307 (2008).
A. Alù, and N. Engheta, "Input Impedance, Nanocircuit Loading, and Radiation Tuning of Optical Nanoantennas" Phys. Rev. Lett. 101, 043901 (2008).
Y. Yao et al, Broad Electrical Tuning of Graphene-Loaded Plasmonic Antennas Nano Letters, 12, 1257 (2013).
P. A. Kossyrev et al, "Electric Field Tuning of Plasmonic Response of Nanodot Array in Liquid Crystal Matrix", Nano Lett. 5, 1978 (2005).
J. Kim et al., "Electrical Control of Optical Plasmon Resonance with Graphene", Nano Lett. 12, 5598 (2012).
N. K. Emani et al, "Electrically tunable damping of plasmonic resonances with graphene", Nano Lett. 12, 5202 (2012).
M. Jablan et al., "Plasmonics in graphene at infrared frequencies" Phys. Rev. B 80, 245435 (2009).
W. Gao et al., "Excitation of plasmonic waves in graphene by guided-mode resonances" Nano 9, 7806 (2012).
D. M. Pozar et al., "Design of millimeter wave microstrip reflectarrays", IEEE Trans. Antenn. Propag. 45, 287 (1997).
Ulusoy et al., "Synthesis of three-dimensional light fields with binary spatial light modulators" J. Opt. Soc. Am. A 28, 1211 (2011).
W.-H. Lee, "Binary computer-generated holograms" Appl. Opt. 18, 3661 (1979).
D. Casasent, "Spatial light modulators" Proc. IEEE 65, 143 (1977).
D. Parker & D. C. Zimmermann, "Phased Arrays—Part I: Theory and Architectures," IEEE Trans. Microwave Theory and Tech., vol. 50, pp. 678-687, 2002.
International Serach Report for International Application No. PCT/US2014/013892 dated Nov. 20, 2014.
Written Opinion for International Application No. PCT/US2014/013892 dated Nov. 20, 2014.
Kong, J.S., "Electromagnetic Wave Theory," EMW Publishing, Cambridge, pp. 1-1025, 2000.

\* cited by examiner

SYSTEM, METHOD AND COMPUTER-ACCESSIBLE MEDIUM FOR DEPTH OF FIELD IMAGING FOR THREE-DIMENSIONAL SENSING UTILIZING A SPATIAL LIGHT MODULATOR MICROSCOPE ARRANGEMENT

CROSS-REFERENCE TO RELATED APPLICATION(S)

This application relates to and claims the benefit and priority from International Patent Application No. PCT/US2014/013892 filed on Jan. 30, 2014, which claims the benefit and priority from U.S. Provisional Application Ser. No. 61/758,604 filed on Jan. 30, 2013, the entire disclosures of which is are incorporated herein by reference.

FIELD OF THE DISCLOSURE

The present application relates to exemplary embodiments system, apparatus and computer-accessible medium for providing a modulation of transmitted or reflected radiation (e.g., mid-infrared radiation) using one or more plasmonic antennas comprising metal and a thin-film material.

BACKGROUND INFORMATION

Mid-infrared (mid-IR) light with wavelengths ranging from 2 μm to 30 μm have unique capabilities of fingerprinting chemicals via their characteristic absorption spectra (see, e.g., Refs. [1] and [2]) and propagating over longer distances in scattering media compared to light with shorter wavelengths (see, e.g., Refs. [3] and [4]). As a result, mid-IR light is uniquely positioned to address a number of important issues in our security, health, and environment (see, e.g., Refs. [5]-[9]). Recently, there has been a rapid development in mid-IR sources and detection systems (see, e.g., Refs. [10]-[13]). However, despite prevalent civil and military interests in high-performance mid-IR modulators and spatial light modulators (SLMs), a viable path towards realizing such devices remains elusive. Existing approaches to modulate mid-IR light have a number of drawbacks that limit their applications. For example, mid-IR modulators based on acousto-optic effects are bulky, require high operating voltage, and have limited modulation speed (see, e.g., Ref [14]). Modulators based on quantum confined Stark shift of inter-subband transitions in semiconductor quantum wells require sophisticated material growth and it is hard to realize pure-phase modulation because of the high absorption losses associated with inter-subband transitions (see, e.g., Refs. [15]-[17]). Active optical components for controlling mid-IR radiation thus present a bottleneck in the development of mid-IR science and technology.

Graphene can be used as the active medium because of its largely tunable optical conductivity in the mid-IR (see, e.g., Refs. [18]-[20]). Metallic plasmonic antennas demonstrate a strong interaction between graphene and infrared light so that the material perturbation introduced by graphene leads to large changes in the optical response of the antennas (see, e.g., Refs. [21] and [22]). Modulators and SLMs consisting of arrays of such antennas can have the following distinguishing features. First, they are optically-thin planar devices. The thickness of the active antenna arrays is less than a few percent of the free-space wavelength. Abrupt and controllable changes to the intensity and phase of light are achieved through optical scattering at plasmonic antennas (see, e.g., Ref. [23]) instead of through an accumulative effect via propagation. Second, our flat optical components can mold optical wavefronts with high spatial resolution and with fast modulation rate because the tunable plasmonic antennas have sub-wavelength footprints and small RC time constant. Previous planar infrared and microwave components have shown static optical responses (see, e.g., Refs. [24]-[33]).

A composite structure consisting of plasmonic antennas and graphene can have widely tunable antenna resonances and, as such, can be used as a building block for reconfigurable flat optical components. This is based on several principles or observations. First, graphene has widely tunable optical conductivity in the mid-IR. The doping of graphene can be adjusted using a bias voltage by a factor of ~10 at room temperature (see, e.g., Ref [34]), which leads to a large change in its sheet conductivity a and therefore the in-plane electric permittivity $\varepsilon_{g1}=1+i\sigma/(\varepsilon_o \omega t)$, where $\varepsilon_o$ is the vacuum permittivity, ω is angular frequency, and t is the thickness of graphene. This effect is illustrated in FIGS. 1(a) and 1(b), which show exemplary in-plane electric permittivity ($\varepsilon_\parallel$) of graphene at different doping levels at room temperature. Solid and dashed lines represent real and imaginary components, respectively. Second, metallic plasmonic antennas are able to capture light from free space and concentrate optical energy into sub-wavelength spots with intensity a few orders of magnitude larger than that of the incident light (see, e.g., Refs. [21]-[22]). Third, by placing graphene in the hot spots created by plasmonic antennas and by tuning the optical conductivity of graphene, the resonant frequency of the metallic plasmonic antennas is tunable over a wide range.

According to perturbation theory, the change in resonant frequency $\omega_{res}$ of a system caused by material perturbation is given by equation (1) below (see, e.g., Ref [35]), $$\frac{\omega_{res}-\omega_o}{\omega_o} \approx \frac{-\int\int\int_V dV[(\Delta\vec{\mu}\cdot\vec{H})\cdot\vec{H}_o^* + (\Delta\vec{\varepsilon}\cdot\vec{E})\cdot\vec{E}_o^*]}{\int\int\int_V dV(\mu|\vec{H}_o|^2 + \varepsilon|\vec{E}_o|^2)} \quad (1)$$

where the denominator represents the unperturbed total energy and the numerator represents the change in magnetic and electric energies, $\Delta\vec{\mu}$ and $\Delta\vec{\varepsilon}$ respectively, caused by the material perturbation (in tensor format to account for anisotropy); $\vec{E}$ and $\vec{H}$ are electric and magnetic fields, respectively, in the presence of the material perturbation; $\vec{E}_o$ and $\vec{H}_o$ are the respective unperturbed fields; and $\vec{E}^*_o$ and $\vec{H}^*_o$ are their respective complex conjugates. According to the theory expressed by equation (1), a large tuning in $\omega_{res}$ can be achieved by enhancing the overlap between the perturbation material (e.g., graphene) and a strong optical field, $\Delta\vec{\varepsilon}\cdot\vec{E}$. Since optical resonances are associated with large changes in the amplitude and phase of the scattered light (see, e.g., Ref [23]), the large tuning in $\omega_{res}$ can produce significant intensity, phase, and polarization modulation.

Although graphene is one material that exhibits advantageous properties when combined with metal in a plasmonic antenna, the person of ordinary skill will readily understand that graphene is merely exemplary and many other such materials may be used advantageously. For example, thin-film materials such as vanadium dioxide, boron nitride, and molybdenum disulfide may be combined with metal in a plasmonic antenna.

Thus, it may be beneficial to provide a plasmonic antenna (e.g., graphene-metal plasmonic antenna) that efficiently modulates the intensity, phase, and/or polarization of radiation (e.g., mid-IR radiation) that can address and/or overcome at least some of the issues and/or problems described herein above.

SUMMARY OF EXEMPLARY EMBODIMENTS

These and other objects of the present disclosure can be achieved by provision of exemplary systems, methods and computer-accessible for generating at least one image of a portion(s) of a sample.

To that end, it is possible to provided antennas, systems, devices, methods, and computer-accessible medium that can utilize the properties of graphene mesh to efficiently modulate the intensity, phase, and/or polarization of incident radiation, including incident mid-infrared ("mid-IR") radiation.

Exemplary embodiments of the present disclosure include a planar antenna comprising one or more sections of graphene mesh and a metallic layer comprising one or more metallic sections, wherein each metallic section is disposed in contact with at least one of the one or more graphene mesh sections and comprises at least one gap that exposes at least one portion of the at least one underlying graphene mesh section to the radiation, and at least one dimension of the at least one gap is related to at least one wavelength of the radiation. In some exemplary embodiments, the metallic layer comprises a plurality of rods arranged with nanoscale gaps in at least one dimension between adjacent rods. In some exemplary embodiments, the metallic layer comprises one or more rectangular apertures having a width less than the at least one wavelength of the radiation. In some exemplary embodiments, the metallic layer comprises one or more cross-shaped apertures having a width less than the at least one wavelength of the radiation. In some exemplary embodiments, the radiation comprises mid-infrared ("mid-IR") radiation.

Exemplary embodiments of the present disclosure also include a computer-implemented method comprising receiving input concerning desired modulation of at least one wavelength of radiation incident on an antenna comprising one or more graphene mesh section; determining one or more parameters for effectuating the desired modulation by varying the doping level of the one or more graphene mesh sections; and providing the determined one or more parameters to a modulator. In some exemplary embodiments, the method further comprises accessing doping response information describing at least one of intensity, phase, and polarization of one or more wavelengths of the radiation for each of a plurality of doping levels of the one or more graphene mesh sections. In some exemplary embodiments, each of the one or more parameters is related to a voltage to be applied between one of the one or more graphene mesh sections and a substrate of the antenna.

Exemplary embodiments of the present disclosure also include a non-transitory, computer-readable medium embodying instructions according to one or more of the computer-implemented method embodiments of the present disclosure. Exemplary embodiments of the present disclosure also include a device comprising a processor and a non-transitory, computer-readable medium embodying instructions according to one or more of the computer-implemented method embodiments of the present disclosure. Exemplary embodiments of the present disclosure also include a system for modulating radiation, comprising a planar antenna comprising one or more graphene mesh sections; an adjustable voltage source coupled to the one or more graphene mesh sections; and a control device coupled to the adjustable voltage source and configured to perform the steps of one or more of the computer-implemented method embodiments of the present disclosure.

These and other objects, features and advantages of the exemplary embodiments of the present disclosure will become apparent upon reading the following detailed description of the exemplary embodiments of the present disclosure, when taken in conjunction with the appended drawings, and enclosed claims.

BRIEF DESCRIPTION OF THE DRAWINGS

Further objects, features and advantages of the present disclosure will become apparent from the following detailed description taken in conjunction with the accompanying Figures showing illustrative embodiments, in which.

Figure 1:
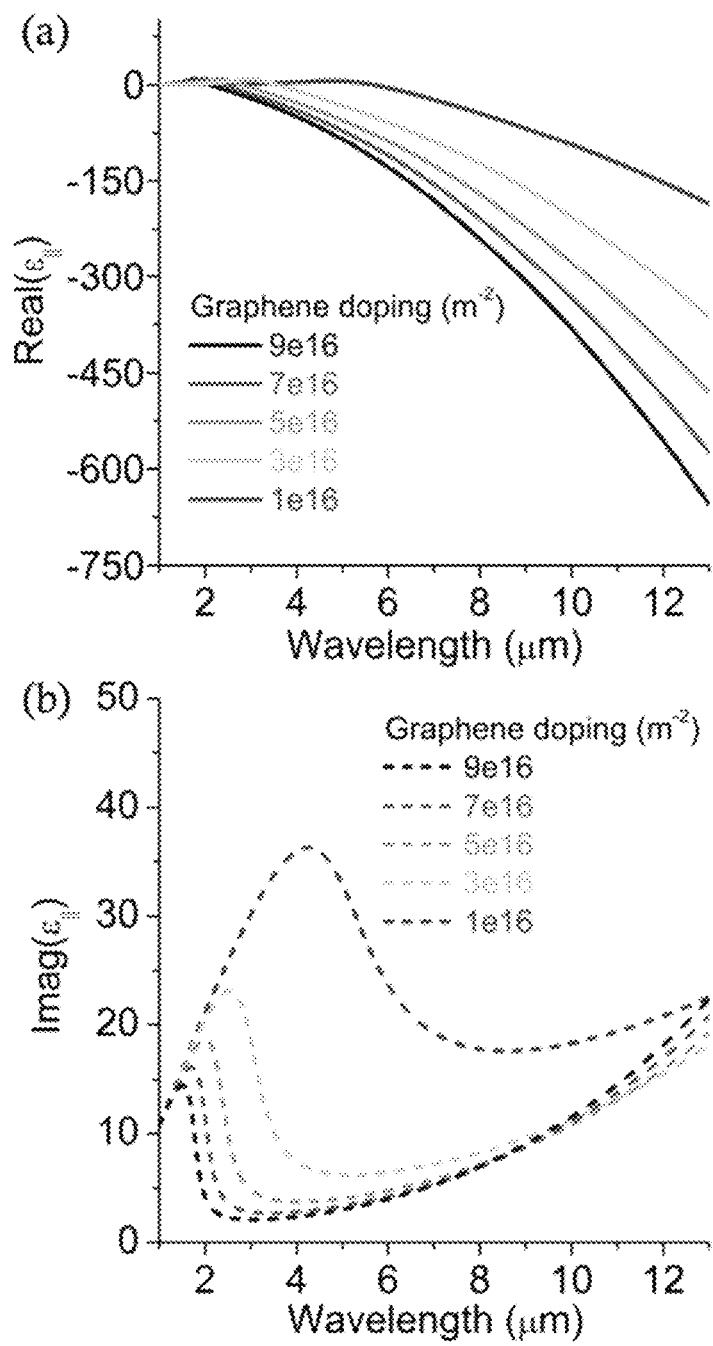
FIGS. 1(a) and 1(b) are graphs of in-plane electric permittivity ($\varepsilon_\parallel$) of graphene at different doping levels at a room temperature according to an exemplary embodiment of the present disclosure.

Throughout the drawings, the same reference numerals and characters, unless otherwise stated, are used to denote like features, elements, components, or portions of the illustrated embodiments. Moreover, while the present disclosure will now be described in detail with reference to the figures, it is done so in connection with the illustrative embodiments and is not limited by the particular embodiments illustrated in the figures and appended claims.

DETAILED DESCRIPTION OF EXEMPLARY EMBODIMENTS

The exemplary embodiments of the present disclosure may be further understood with reference to the following description and the related appended drawings, but not limited thereby. The exemplary embodiments of the present disclosure relate to an exemplary system, method and computer-accessible medium for extended depth of field imaging utilizing spatial light modulation. According to an exemplary embodiment of the present disclosure, exemplary methods systems and computer-accessible medium for modulating infrared light based on electrically-tunable plasmonic antennas.

For example, a large modulation of the amplitude and phase of mid-infrared (e.g., mid-IR) light can be achieved by dynamically shifting the resonance of graphene-metal plasmonic antennas via electrical tuning of the optical conductivity of graphene. Exemplary simulations and calculations can indicate that the scattered light from arrays of such antennas exhibit intensity modulation with high on/off extinction ratio exceeding 100, large phase tuning up to 240 degrees, and fast modulation rate on the order of a few GHz. These exemplary properties can be useful for creating reconfigurable flat optical components such as modulators and spatial light modulators in the mid-IR spectral range.

Exemplary embodiments of the present disclosure can be directed to two or more exemplary antenna structures and/or configurations that can support strong light-graphene interaction: (a) arrays of metallic rods patterned into various shapes that are separated by nanoscale gaps; and (b) aperture antennas with sub-wavelength width defined in metallic films. Nevertheless these structures are merely exemplary and the person of ordinary skill can readily comprehend that the principles of enhancement by light-graphene interaction disclosed herein can be applicable to other antenna structures currently known or later devised.

It is possible, e.g., to utilize finite-difference time-domain (FDTD) simulations to calculate or otherwise determine an optical response of antennas. The reflection spectra of antenna arrays can be obtained by simulating one unit cell of the array while applying periodic boundary conditions. Graphene is modeled as an anisotropic material. The in-plane optical conductivity graphene can be calculated or otherwise determined using the following equation based on random-phase approximation (see, e.g., Ref [36]):

$$\sigma(\omega) = \frac{2ie^2 k_B T}{\pi\hbar^2(\omega + i\tau^{-1})}\ln\left[2\cosh\left(\frac{E_f}{2k_B T}\right)\right] + \frac{e^2}{4\hbar}\left\{\frac{1}{2} + \frac{1}{\pi}\arctan\left(\frac{\hbar\omega - 2E_f}{2k_B T}\right) - \frac{i}{2\pi}\ln\left[\frac{(\hbar\omega + 2E_f)^2}{(\hbar\omega - 2E_f)^2 + (2k_B T)^2}\right]\right\}, \quad (2)$$

with the first and second terms representing contributions from intra- and inter-band transitions, respectively. In addition, e is the elementary charge, $k_B$ is the Boltzmann constant, T is temperature, and $\hbar$ is the reduced Planck constant, $E_f = \hbar V_f \sqrt{\pi n_s}$ is the Fermi level (where $V_f = 10^6$ m/s is the Fermi velocity and $n_s$ is the sheet doping of graphene), and τ is carrier relaxation lifetime and characterizes electron-disorder scattering processes (maintained at 0.25 ps, achievable in graphene with reasonably high carrier mobility) (see, e.g., Ref [37]). According to an exemplary embodiment of the present disclosure, the out-of-plane refractive index of graphene can be maintained at about 1.5 (changes to this value have minimal effects on simulation results). For purposes of equation (2), graphene can be modeled by one layer of FDTD mesh cells with thickness t=0.33 nm and a planar size of 1 nm×1 nm. FIGS. 1(a) and 1(b) illustrate exemplary graphs of a calculated room-temperature in-plane electric permittivity of graphene $\varepsilon_{\parallel}$ at different graphene doping levels. In particular, FIG. 1(a) shows a graph of real($\varepsilon_{\parallel}$), which becomes more negative with increasing wavelength, while FIG. 1(b) shows a graph of imag($\varepsilon_{\parallel}$), which is positive but substantially less than real($\varepsilon_{\parallel}$).

Figure 2:
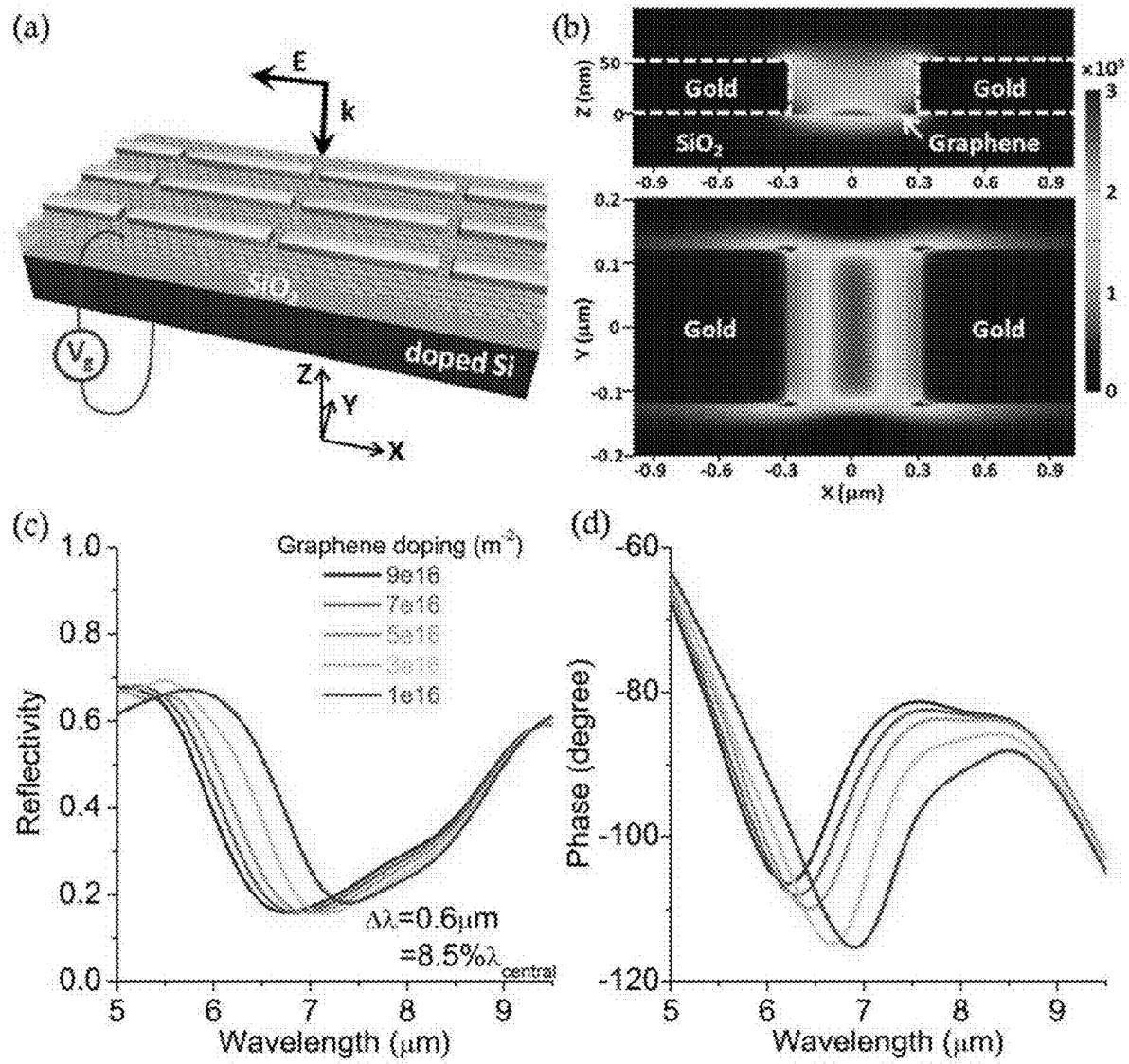
FIG. 2(a) is an illustration of an electrically-tunable array of metallic rod antennas loaded with graphene patterned on $SiO_2$—Si substrate according to one or more embodiments of the present disclosure.
FIG. 2(b) is a set of cross-sectional and overhead views of a light intensity distribution in an antenna gap of the electrically-tunable array of FIG. 2(a)
FIGS. 2(c) and 2(d) are exemplary graphs of a reflective intensity and a phase, respectively, at particular mid-IR wavelengths of the exemplary antenna array shown in FIG. 2(a) at different graphene doping levels.
Figure 7:
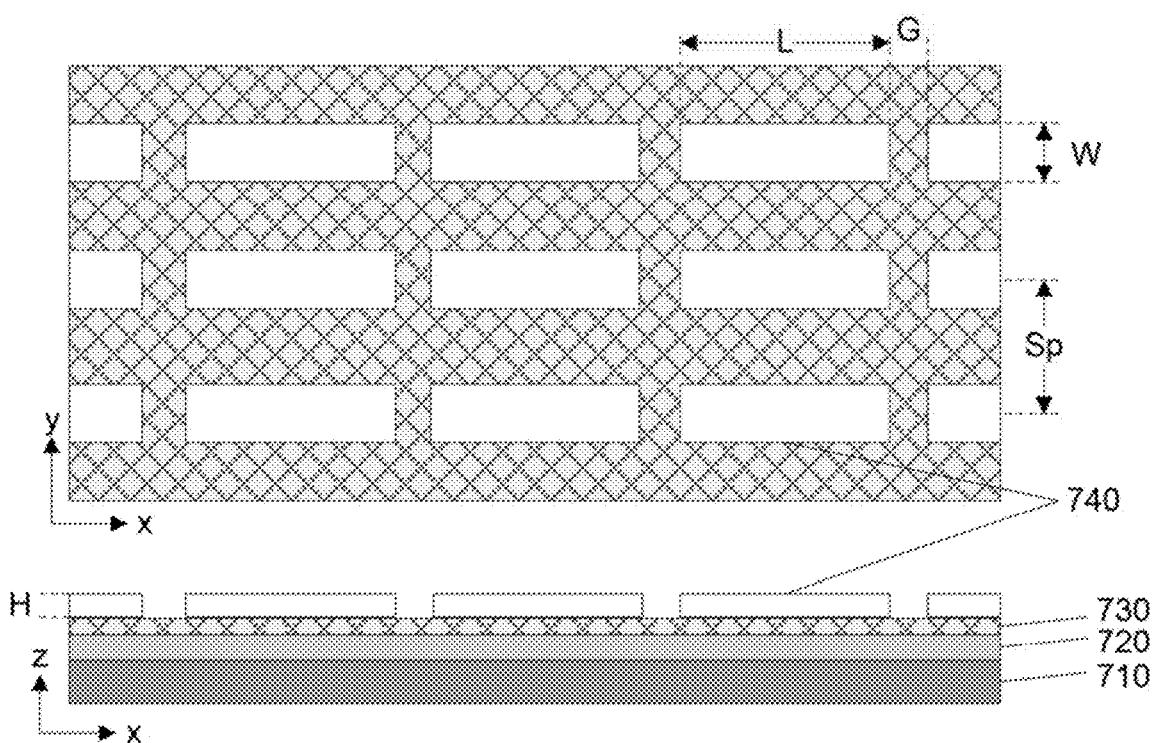
FIG. 7 is a set of two-dimensional views (e.g., top and side cross-sectional views) corresponding to exemplary electrically-tunable arrays of metallic rod antennas) such as one or more of the exemplary embodiments illustrated by FIGS. 2(a) and 5(a)

FIG. 2(a) shows an illustration of a tunable rod antenna array according to one or more exemplary embodiments of the present disclosure. In these exemplary embodiments, a graphene sheet is disposed in contact with a silicon dioxide ($SiO_2$) layer, with the graphene covering the entire surface in certain embodiments. The $SiO_2$ layer is disposed in contact with a heavily doped silicon (Si) substrate. FIG. 7 further illustrates the top (x-y) and side (x-z) views of such exemplary arrangement according to an exemplary embodiment of the present disclosure. For example, Si substrate 710 may have an exemplary thickness of certain amount of nm, $SiO_2$ layer 720 can have an exemplary thickness of about 285 nm, and graphene mesh layer 730 may have an exemplary thickness of about 0.33 nm, as discussed herein. A plurality of metallic rods 740 can be disposed or provided on top of graphene mesh layer 730 and arranged in a regular pattern, such as the exemplary pattern shown in FIGS. 2(a) and 7. In some exemplary embodiments of the present disclosure, the rods can include, e.g., gold material. In the exemplary pattern shown in FIG. 7, each of the gold rods can have a length (L), width (W), and height (H) of, e.g., about 1.84 μm, 240 nm, and 50 nm, respectively, while the antenna gap (G) can be, e.g., about 60 nm and the spacing (Sp) between rows of antenna rods can be about 2 μm. Nevertheless, these dimensions are merely exemplary and the person of ordinary skill will readily comprehend that other dimensions may be employed advantageously.

As one example, only the portion of the graphene sheet disposed in the antenna gaps strongly interacts with optical fields and thereby contributes to the antenna resonance. As discussed in greater detail herein below, the exemplary antenna resonance can be tuned by varying the doping of the graphene mesh. In one exemplary embodiment, as shown in FIG. 2(a), an adjustable bias voltage (Vg) can be applied between the antenna layer and the doped Si substrate (e.g., substrate 710 shown in FIG. 7) to change the doping of graphene by the well-known electric-field effect. In some exemplary embodiments of the present disclosure, this adjustable bias voltage can be provided by an adjustable voltage source that is coupled to, and under control of, a computer or other processing apparatus can execute instructions stored in a non-transitory, computer-readable medium.

An illustration of a strong interaction between the graphene mesh and is shown in FIG. 2(b), which illustrates an exemplary surface-plasmon (SP) standing wave of high intensity (e.g., an intensity enhancement~3000) supported by graphene (e.g., doped at about $5 \times 10^{16}$ m$^{-2}$) located in the antenna gap. The standing wave can strongly interact with graphene, e.g., leading to a considerable perturbation to the resonant frequency of the rod antennas. As discussed above in relation to FIGS. 1(a) and 1(b), the exemplary permittivity of graphene can be, e.g., primarily a real number and can become more negative as its doping increases. According to a perturbation theory expressed by equation (1) above, this can lead to an increasing resonant frequency $\omega_{res}$. FIGS. 2(c) and 2(d) show exemplary graphs of the reflective intensity and phase, respectively, at particular mid-IR wavelengths of the exemplary antenna array of FIG. 2(a). For example, FIG. 2(c) shows a graph indicating that when the sheet doping of graphene is changed from $1 \times 10^{16}$ to $9 \times 10^{16}$ m$^{-2}$, the dip in the reflection spectra of the antenna array shifts by $\Delta\lambda = 0.6$ μm, a significant amount corresponding to ~8.5% of the central operating wavelength ($\lambda_{central} = 7.05$ μm). This shift of the spectral dip or notch toward shorter wavelengths is equivalent to shifting the spectral dip toward higher frequencies—a so-called "blue shift."

Another way to understand the blue shift is that as the graphene doping increases, the leakage current across the antenna gap mediated by graphene becomes larger. This effectively reduces the capacitive coupling between neighboring antenna rods, resulting in a shift of the resonant frequency $\omega_{res}$ (see, e.g., Refs. [38]-[39]). Indeed, the exemplary graph of FIG. 2(c) indicates that the structure of FIG. 2(a) can facilitate a maximum reflectivity modulation, e.g., of ~30%, which can occur at λ=about 6.5 μm. Moreover, the graph of FIG. 2(d) indicates that the structure of FIG. 2(a) can facilitate, e.g., a maximum phase tuning or phase modulation of ~30 degrees (as observed in far-field) which occurs at λ=7 μm. The exemplary results shown in the graphs of FIGS. 2(c) and 2(d) have been confirmed in experiments (see, e.g., Ref. [40]) showing that as the graphene doping level is varied by a factor of ~10 (e.g., $1 \times 10^{16}$ to $9 \times 10^{16}$ m$^{-2}$), the spectral dip shifts by $\Delta\lambda = 0.51$ μm, corresponding to ~7.5% of the central operating wavelength ($\lambda_{central} = 6.8$ μm). This large wavelength tuning demonstrated in experiments and simulations represents a major improvement over previous work on tunable plasmonic structures (see, e.g., Refs. [41]-[43]) in which there was no enhancement of the interaction between light and active media and, accordingly, very small tuning effects.

Figure 3:
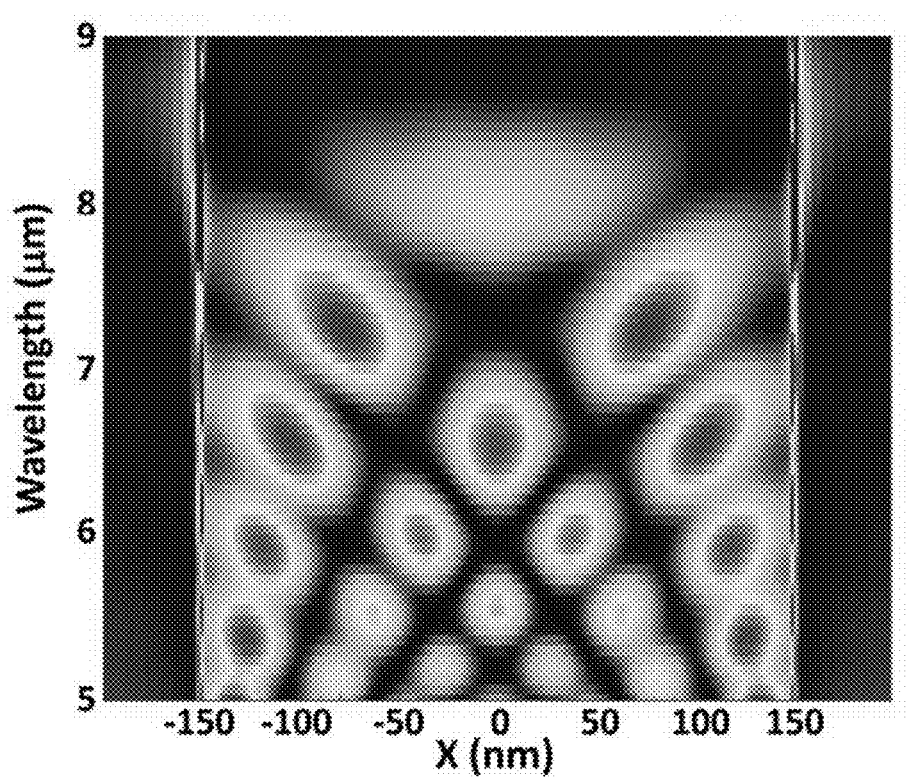
FIG. 3 is an intensity profile of an exemplary surface-plasmon standing wave on graphene in a 300-nm antenna gap, according to an exemplary embodiment of the present disclosure.

Graphene SPs can be very different from conventional SPs supported by metal-dielectric interfaces (see, e.g., Ref [44]). Distinctive characteristics of mid-IR graphene SPs include ultra-strong localization (e.g., 1/e decay distance normal to graphene~tens of nm), "deep UV" wavelength (~tens of nm), and very large propagation constant (e.g., in-plane wavevector~100 times of free-space wavevector). Because of the large wavevector mismatch ($\Delta k$) between SPs propagating on graphene and on metal, the graphene patch in the antenna gap can form an effective Fabry-Pérot cavity for graphene SPs, resulting in standing waves. This exemplary effect is shown in the illustrations of FIG. 2(b), as discussed above, and is further illustrated in FIG. 3, which shows an illustration of standing waves with multiple antinodes in a wide antenna gap. According to the physical principles illustrated in FIGS. 2(b) and 3, the antenna rods can capture incident IR radiation from free space (e.g., ambient radiation or targeted radiation such as from a laser), and convert this IR energy into surface waves propagating along the rods, which excites graphene SPs in the antenna gap. Metallic antenna rods efficiently couple antenna surface waves into graphene SPs because the sharp edges of rods provide a preferable spatial frequency component that compensates the wavevector mismatch, $\Delta k$. Efficient generation of graphene SPs has also been theoretically demonstrated using gratings with deep-sub-wavelength period (see, e.g., Ref [45]).

A perturbation theory can indicate that a larger tuning of plasmonic resonance is achieved in structures supporting a larger spatial overlap between graphene and optical fields. The rod-antenna design discussed herein may not be optimized to achieve the largest tuning because the structure can have considerable fringing fields outside antenna gaps. According to an exemplary embodiment of the present disclosure, an aperture antenna structure can provide an interaction between the antenna near-fields and the graphene in the aperture that can result in, e.g., a larger tuning of optical resonance. In addition, the exemplary aperture antennas can be more suitable as building blocks for SLMs because they can operate alone, while rod antennas rely on neighbors to confine light.

Figure 4:
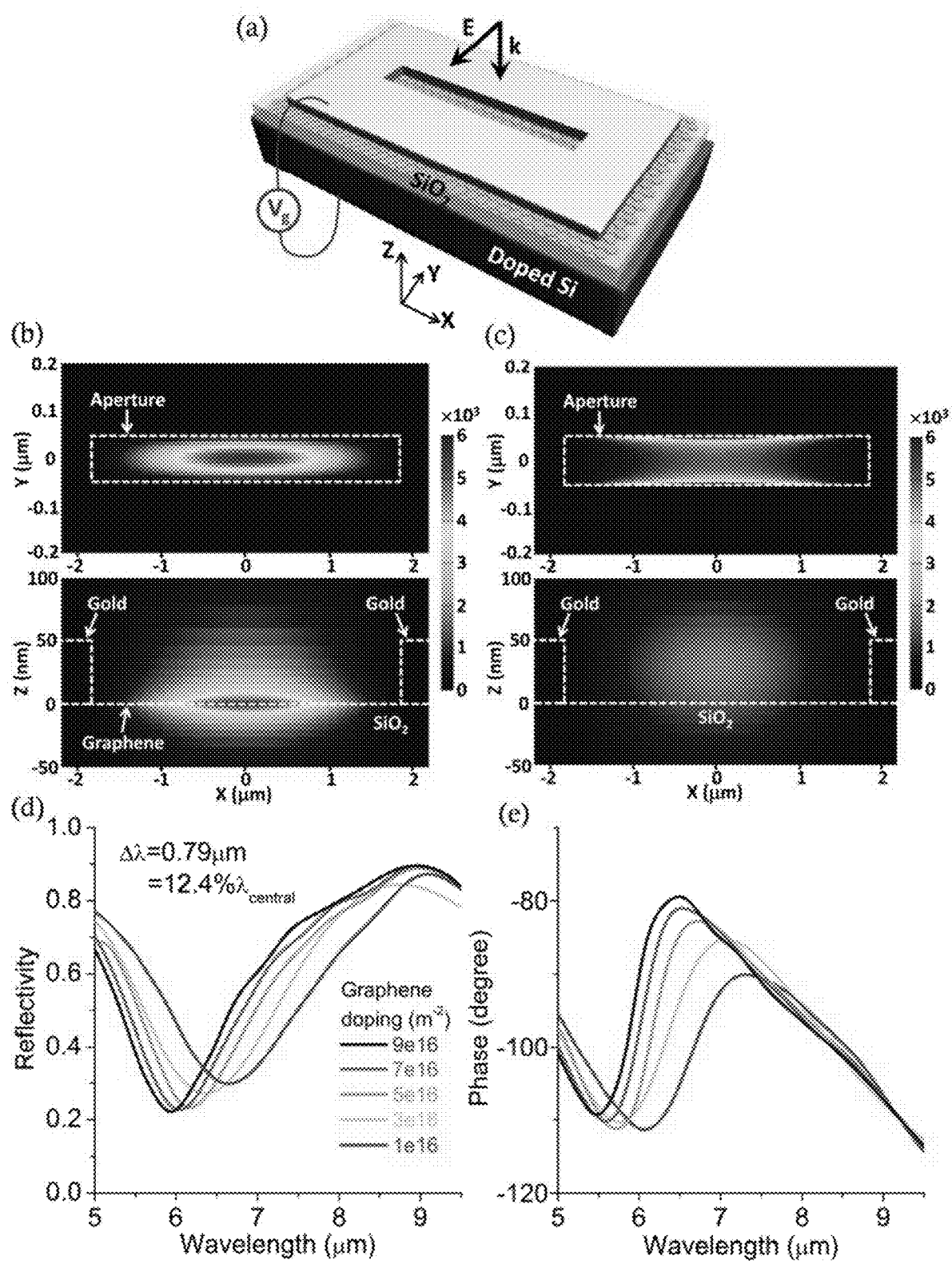
FIG. 4(a) is an illustration of an electrically-tunable aperture antenna loaded with having a graphene pattern on $SiO_2$—Si substrate according to one or more embodiments of the present disclosure.
FIG. 4(b) shows cross-sectional and overhead views of a set of the light intensity distributions in the exemplary antenna gap of the exemplary electrically-tunable aperture antenna shown in FIG. 4(a), when graphene is provided in the antenna gap.
FIG. 4(c) shows cross-sectional and overhead views of a set of the light intensity distributions in the exemplary antenna gap of the exemplary electrically-tunable aperture antenna shown in FIG. 4(a), when graphene is not provided in the antenna gap.
FIGS. 4(d) and 4(e) are exemplary graphs of the reflective intensity and phase, respectively, at particular mid-IR wavelengths of the exemplary aperture array shown in FIG. 4(a) at different graphene doping levels.
Figure 8:
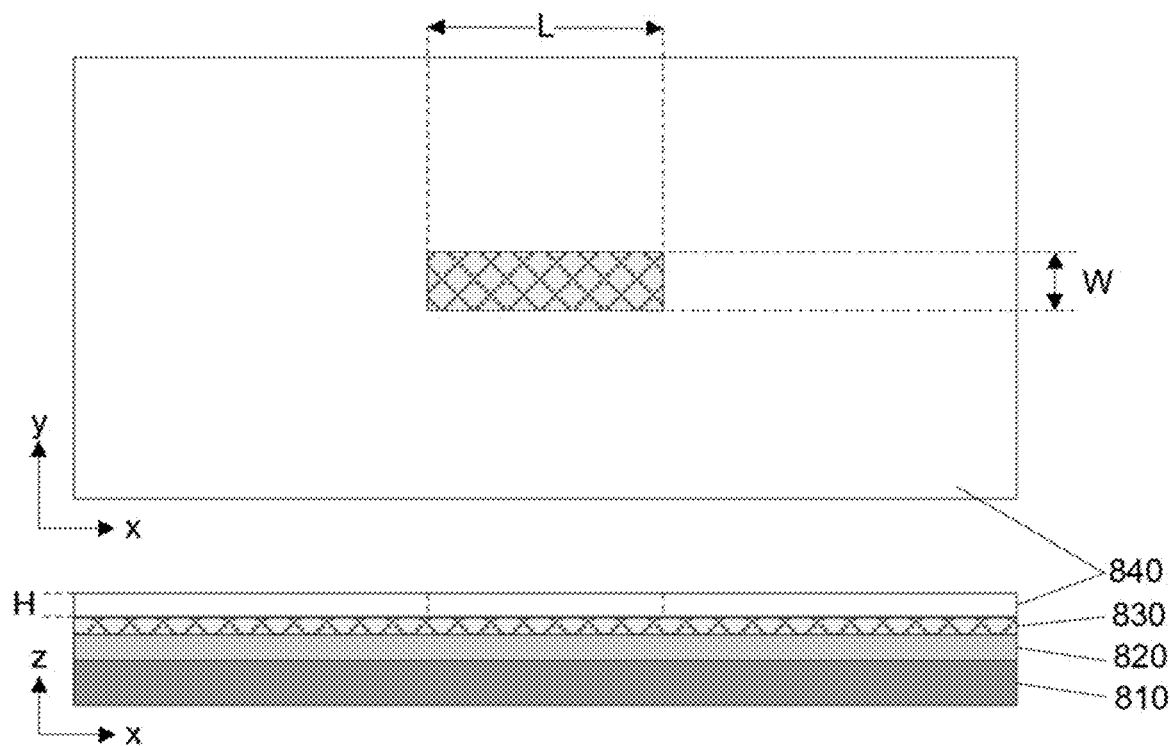
FIG. 8 is a set of two-dimensional views (e.g., top and side cross-sectional views) corresponding to exemplary electrically-tunable aperture arrays, such as one or more of the exemplary embodiments that are illustrated in FIGS. 4(a) and 6(a)

FIG. 4(a) shows a schematic illustration of a tunable aperture antenna according to one or more exemplary embodiments of the present disclosure. In these exemplary embodiments, a graphene sheet can be disposed in contact with a silicon dioxide ($SiO_2$) layer, with the graphene covering the entire surface in certain embodiments. The $SiO_2$ layer can be disposed in contact with a heavily doped silicon (Si) substrate. FIG. 8 further illustrates top (x-y) and side (x-z) views of this exemplary arrangement. For example, Si substrate 810 may have an exemplary thickness of a certain number of nm, $SiO_2$ layer 820 may have an exemplary thickness of 285 nm, and graphene mesh layer 830 may have an exemplary thickness of 0.33 nm, as discussed above. A metallic layer 840 can be disposed in contact with graphene mesh layer 830, with layer 840 having at least one aperture through which the underlying portion of the graphene mesh is exposed to incident radiation, including mid-IR radiation. In some exemplary embodiments, metallic layer 840 can include, e.g., a gold material. In the exemplary arrangement shown in FIG. 8, the aperture can have a length (L), width (W), and height (H) of about, e.g., 3.7 μm, 100 nm, and 50 nm, respectively. Nevertheless, these dimensions are merely exemplary and the person of ordinary skill will readily comprehend that other dimensions may be employed advantageously.

A strong exemplary interaction between the graphene mesh and mid-IR radiation is further illustrated in FIG. 4(b), which shows an illustration of an exemplary surface-plasmon (SP) standing wave of high intensity (intensity enhancement~6000) supported by graphene (doped at $2 \times 10^{16}$ $m^{-2}$). As shown therein, an area located in the antenna aperture can be 4.4 μm-×-2 μm. The standing wave can strongly interact with graphene, e.g., leading to a considerable perturbation to the resonant frequency of the rod antennas. The exemplary effect of graphene is further illustrated in a graph of FIG. 4(c), which shows that in the absence of the underlying graphene mesh, the near-field maxima of the exemplary structure shown in FIG. 4(a) can be located on the long edges of the aperture where charges are accumulated. In contrast, FIG. 4(b) shows that when the aperture is loaded with graphene, a near-field maximum advantageously occurs at the aperture center on the surface of the graphene.

As a result of the stronger graphene-SP interaction, the tuning of reflection spectra of aperture antennas can be much larger than that of the rod antennas. This can be evident by comparing the reflectivity performance of the rod array and aperture structures shown in the exemplary graphs of FIGS. 2(c) and 4(d), respectively. For example, the graph of FIG. 4(d) indicates that $\Delta\lambda = 12.4\%$ $\lambda_{central}$ is achieved when graphene doping is changed from $1 \times 10^{16}$ to $9 \times 10^{16}$ $m^{-2}$ (compare to 7.5% $\lambda_{central}$ in FIG. 2(c)). FIG. 4(d) also shows that the exemplary structure shown in FIG. 4(a) can facilitate a maximum reflectivity modulation of, e.g., ~30%, which occurs at $\lambda = 6$ μm, while FIG. 4(e) shows that the exemplary structure of FIG. 4(a) can facilitate a maximum phase modulation of ~30 degrees (e.g., as observed in far-field) which occurs at $\lambda = 6.25$ μm. These exemplary results are comparable to the exemplary rod array structure shown in FIG. 2(a).

Nevertheless, the amount of intensity modulation available from the exemplary rod and aperture antenna structures discussed above is limited because the resonant dips of the intensity spectra have broad width and limited depth, as shown in the exemplary graphs of FIGS. 2(c) and 4(d). In addition, the available phase tuning may not be sufficient for certain applications. Such problems may be addressed by designs based on reflect-arrays, which comprise of arrays of phased antennas separated from a metallic back-plane by a dielectric spacing layer (see, e.g., Ref [46]). In some exemplary embodiments of the present disclosure, the spacing layer can be, e.g., a sub-wavelength in thickness, resulting in a strong optical coupling between the metallic antennas and metallic back-plane. Compared to exemplary configurations including a single layer of scatterers, as illustrated by FIGS. 2(a)-2(d) and 4(a)-4(d), exemplary reflect-arrays can facilitate a larger reflected power and support plasmonic resonances with higher quality factors, leading to narrower antenna resonances and a larger range of phase tuning.

FIG. 5(a) shows a schematic illustration of a tunable rod antenna reflect-array according to one or more exemplary embodiments of the present disclosure. In these exemplary embodiments, a graphene sheet can be disposed in contact with a silicon dioxide ($SiO_2$) layer, with the graphene covering the entire surface in certain embodiments. The $SiO_2$ layer is disposed in contact with a metallic substrate, which in some exemplary embodiments of the present disclosure may be a gold (Au) substrate. FIG. 7 further illustrates the top (x-y) and side (x-z) views of this exemplary arrangement for the exemplary embodiment shown in FIG. 5(a). For example, the parameters of FIG. 7 for this exemplary embodiment can be similar or substantially the same as the parameters for the embodiment shown in FIG. 2(a), except that substrate 710 can be of a different material, $SiO_2$ layer 720 may have an exemplary thickness of, e.g., about 400 nm, and the antenna gap (G) may be, e.g., about 30 nm. Nevertheless, these dimensions are merely exemplary and the person of ordinary skill will readily comprehend that other dimensions may be employed advantageously.

FIGS. 5(b) and 5(c) show exemplary graphs of the reflective intensity and reflective phase, respectively, at particular mid-IR wavelengths of the exemplary antenna reflect-array of FIG. 5(a). These exemplary graphs illustrate a number of desirable features and significant improvements of the reflect-array compared to the array on the doped Si substrate shown in the illustration of FIG. 2(a). First, the resonant dips of the reflection spectra can be quite sharp. As shown in the graph of FIG. 5(b), the waist of the dips (e.g., measured between λ, corresponding to 50% of maximum reflective intensity) are ~0.7 μm and the change in reflectivity ΔR (i.e., from maximum to minimum) can be 80-90%. As shown in the graphs of FIGS. 2(c) and 4(d), single layers of antennas produce resonant dips with waists of, e.g., about 1.5-2.5 μm and AR of about 40-60%. These sharp resonances can be due to the coupling between rod antennas and their image resonators in the metallic (e.g., gold) back-plane. Coupled optical resonators with a sub-wavelength separation can have a much larger quadrupolar component in their charge distribution than individual resonators. This can indicate that considerable optical energy is trapped in the near-field and resulting in a higher quality factor or sharper resonance.

Second, the wavelength tuning range of the exemplary reflect-array shown in the graph of FIG. 5(a) can be large. For example, by changing the bias voltage (Vg), the resonant wavelength can be shifted by $\Delta\lambda=0.85$ µm (12.5% $\lambda_{central}$), compared to $\Delta\lambda=0.6$ µm (8.5% $\lambda_{central}$) for the exemplary single layer of rod antennas shown in FIG. 2(c). The increased wavelength tuning can also be due to enhanced optical near-fields in the reflect-array structure. For example, the intensity enhancement in the antenna gap of the reflect-array can be, e.g., ~20,000, about six (6) times greater than enhancement in the antenna gap of the single-layered rod array structure shown in FIG. 2(a).

Third, the available exemplary phase tuning range for particular wavelengths of mid-IR radiation can be large due to the coupling between the antennas and their images in the back-plane. For example, the graph of FIG. 5(c) can indicate that the phase of the reflected mid-IR radiation can be continuously tuned over, e.g., ~240 degrees for wavelengths in the range, e.g., about 6.5-7.0 µm. This exemplary range can represent an eight-fold increase over the range available from the single-layer rod array structure shown in the illustration of FIG. 2(a). Coupled antennas can provide the entire $2\pi$ phase coverage, as demonstrated in near-infrared and microwave spectral ranges (see, e.g., Refs. [30],[31], and [36]).

According to other exemplary embodiments of the present disclosure, these exemplary principles may be applied to the aperture antenna structure shown in FIG. 4(a) to obtain an aperture reflect-array, such as the exemplary structure shown in FIG. 6(a). In these embodiments, a graphene sheet is disposed in contact with a silicon dioxide ($SiO_2$) layer, with the graphene covering the entire surface in certain embodiments. The $SiO_2$ layer is disposed in contact with a metallic substrate, which in some exemplary embodiments of the present disclosure may be a gold (Au) substrate. FIG. 8 further illustrates the top (x-y) and side (x-z) views of this arrangement for the exemplary embodiment shown in FIG. 6(a). In some exemplary embodiments of the present disclosure, the parameters of FIG. 8 for this exemplary embodiment may be substantially the same as the parameters for the exemplary embodiment shown in FIG. 2(a), except that substrate 810 can be a different material, and $SiO_2$ layer 820 can have an exemplary thickness of about 400 nm. Nevertheless, these dimensions are merely exemplary and the person of ordinary skill will readily comprehend that other dimensions may be employed advantageously.

FIGS. 6(b) and 6(c) show exemplary graphs of the intensity and phase, respectively, at particular mid-IR wavelengths of the aperture reflect-array shown in the illustration of FIG. 6(a). For example, the graph of FIG. 6(b) illustrates that the in resonant wavelength tuning range can be, e.g., $\Delta\lambda=0.66$ µm (10.8% of $\lambda_{central}$), the resonant dips can have a waist of, e.g., about 0.5-1 µm, and the change in reflectivity $\Delta R$ can be ~90%. Moreover, the graph of FIG. 6(c) indicates that in the mid-IR wavelength range of, e.g., 6.0-6.25 µm, the available phase tuning range can be approximately 240 degrees. These properties compare favorably with the results for aperture antennas on a $SiO_2$—Si substrate, shown in and discussed above with reference to the exemplary graphs of FIGS. 4(d)-4(e).

Figure 15:
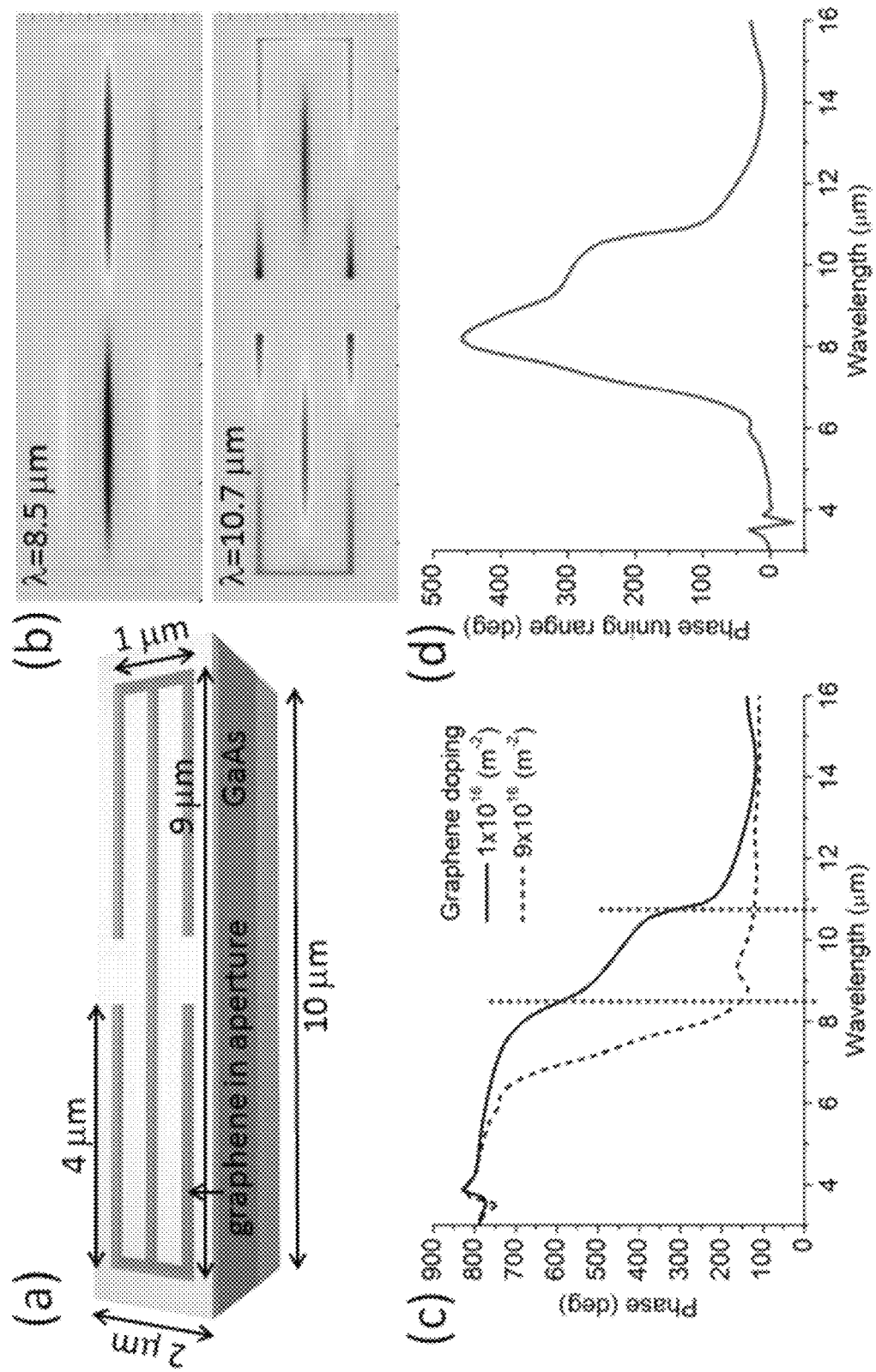
FIG. 15(a) is an illustration of a folded aperture antenna supporting multiple antenna resonances and a wide phase tuning range, according to one or more exemplary embodiments of the present disclosure.
FIG. 15(b) is an illustration of an out-of-plane component of magnetic field at two wavelengths for two modes of the exemplary folded aperture antenna shown in FIG. 15(a)
FIG. 15(c) is an exemplary graph of reflective phase at particular wavelengths for two exemplary graphene doping levels of the exemplary folded aperture antenna shown in FIG. 15(a)
FIG. 15(d) is an exemplary graph of the difference between the reflective phases at the two graphene doping levels illustrated in FIG. 15(c)

FIG. 15(a) shows a schematic illustration of a a further tunable aperture antenna supporting multiple resonances that can provide a wider phase tuning range, according to one or more exemplary embodiments of the present disclosure. The exemplary aperture antenna shown in FIG. 15(a), which may be a unit cell of an antenna array, may provide at least three resonances due to its folded, multi-segment geometry. As discussed herein with respect to other exemplary embodiments, the exemplary structure of FIG. 15(a) may comprise a metallic layer disposed on top of a graphene mesh layer, such that the graphene mesh is exposed in the antenna gaps.

FIG. 15(b) shows an illustration of a strong interaction between the graphene and metal in the antenna gaps, showing an exemplary out-of-plane component of magnetic field of two antenna modes at wavelengths of 8.5 and 10.7 µm for a graphene doping level of $1\times10^{16}$ m$^{-2}$. FIG. 15(b) illustrates, for example, two higher-order antenna resonances in the exemplary antenna structure shown in FIG. 15(a). Each of these resonances may introduce large phase shifts, bringing the total available phase shift to ~600 degrees. This is illustrated, for example, by FIG. 15(c), which shows the phase shift introduced by the exemplary antenna structure of FIG. 15(a) for a range of mid-IR wavelengths at each of two graphene doping levels. FIG. 15(d) shows the difference between the two phase curves of FIG. 15(c), illustrating that an exemplary phase modulation range of 460 degrees can be achieved by selecting between the two graphene doping levels.

Figure 16:
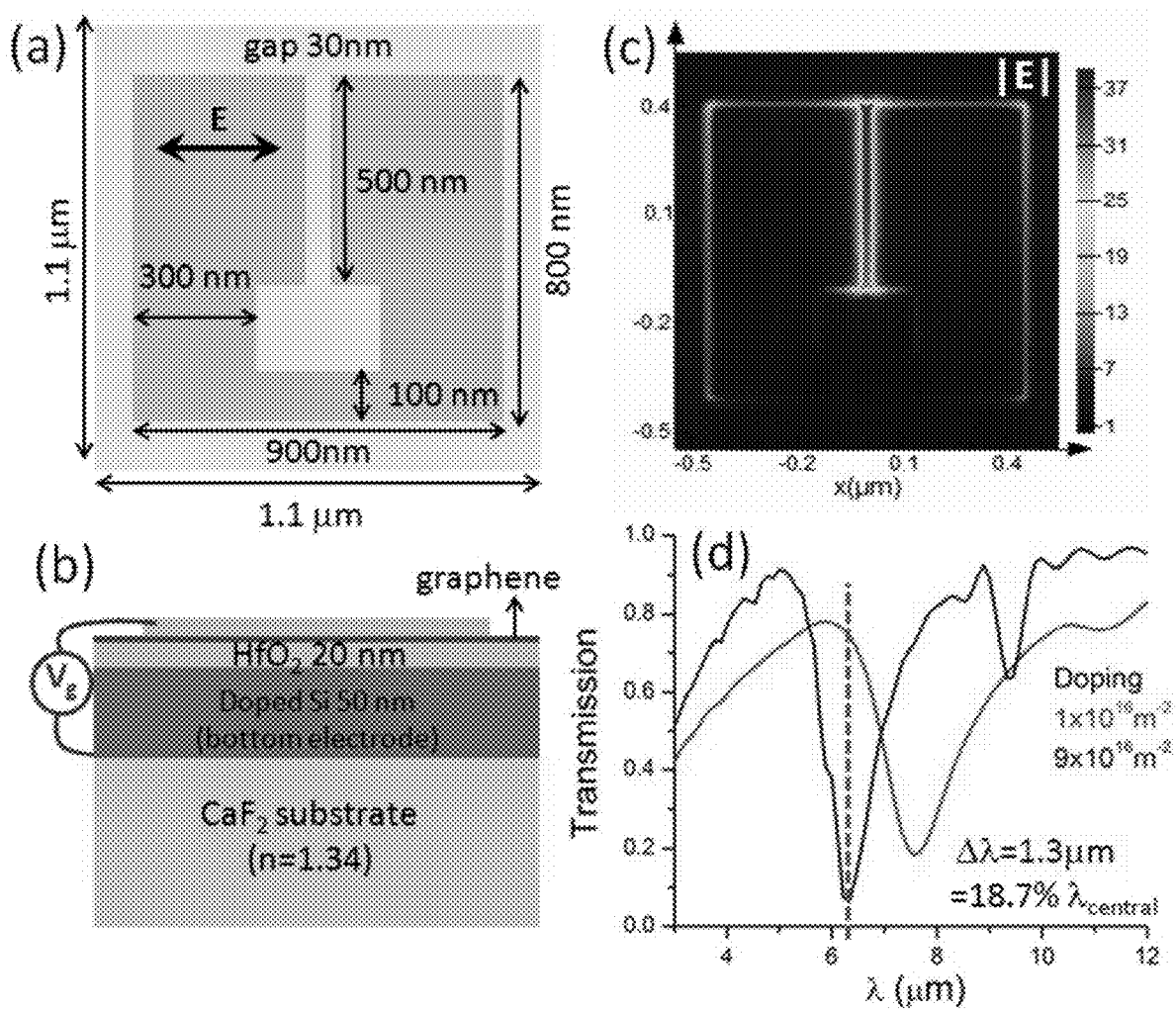
FIGS. 16(a) and 16(b) are top and side views, respectively, illustrating a split-ring resonator antenna for binary-intensity modulation of transmitted light, according to one or more exemplary embodiments of the present disclosure.
FIG. 16(c) is an exemplary graph of the transmitted intensity in the gap of and phase, respectively, at particular mid-IR wavelengths of the exemplary split-ring resonator antenna shown in FIG. 16(a)
FIG. 16(d) is an exemplary graph of transmission intensity at particular wavelengths for two exemplary graphene doping levels of the exemplary split-ring resonator antenna shown in FIG. 16(a).

FIGS. 16(a) and 16(b) show illustrations of the top and side views, respectively, of a split-ring resonator antenna, according to one or more exemplary embodiments of the present disclosure. The exemplary split-ring resonator antenna shown in FIGS. 16(a) and 16(b), which may be a unit cell of an antenna array for binary-intensity modulation, comprises a long gap that can increase the volume of interaction between light and graphene, thereby maximizing the perturbation caused by the resonator. This exemplary effect is shown in an exemplary illustration of FIG. 16(c), which indicates the strong interaction between infrared light and graphene in the antenna gap of the exemplary antenna structure shown in FIG. 16(a). FIG. 16(d) illustrates a graph providing additional advantages of this structure, including an available 18.7% tuning of resonant wavelength and >10× range of transmission power modulation (e.g., 7% to 75%) at $\lambda=6.3$ µm by selecting between two exemplary graphene doping levels.

In other exemplary embodiments according to the present disclosure, exemplary mid-IR intensity modulators with a desirable high extinction ratio $r_e$ (i.e., ratio of "on" and "off" reflective intensities) and fast modulation speed can be constructed using reflect-arrays comprising identical rod or aperture antennas sharing a common bias voltage. For example, a maximum $r_e$~980 at $\lambda=7.24$ µm can be achieved using reflect-arrays of rod antennas. Moreover, exemplary reflect-arrays of rod antennas may have a range of wavelength exhibiting a suitably large $r_e$, e.g., the range $\Delta\lambda_{20dB}$ for $r_e>100$ may be as much as 0.15 µm. Reflect-arrays of aperture antennas can have similar performance, e.g., $r_e$~110 at $\lambda=6.45$ µm and $\Delta\lambda_{20dB}=0.04$ µm as shown in the graph of FIG. 6(b). A mid-IR intensity modulator, can comprise a 50×50 array of rod antennas with a footprint of ~100 µm×100 µm, provides an available modulation rate of a few GHz. This rate is limited by the resistance-capacitance (RC) time constant of the exemplary device. The resistance is typically a few kilo-ohms (k$\Omega$), mainly due to the contact resistance between graphene and antenna electrodes. The exemplary capacitance can occur between the graphene mesh and the gold back-plane. The large extinction ratio $r_e$ and high available modulation rate can be suitable for modulating, e.g., single-mode, mid-IR lasers such as $CO_2$ lasers and quantum cascade lasers.

Figure 9:
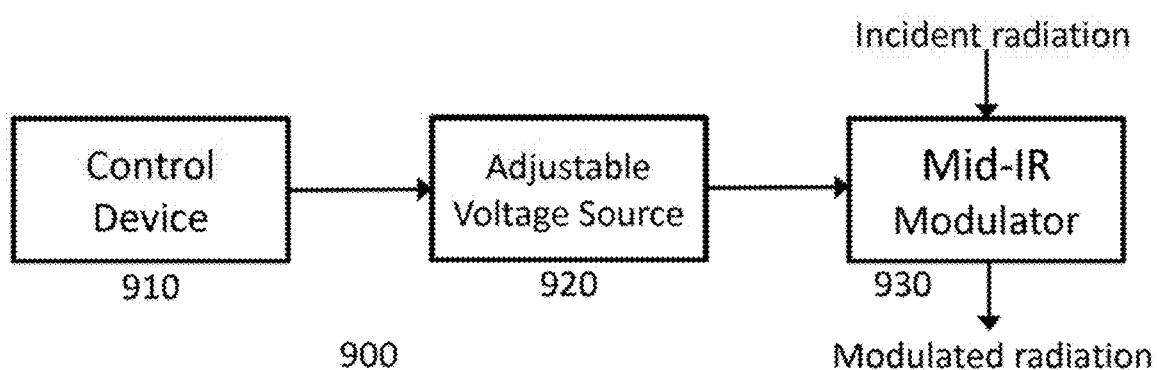
FIG. 9 is a block diagram of an exemplary mid-IR modulation system according to one or more embodiments of the present disclosure.

A block diagram of an exemplary modulation system 900 according to one or more exemplary embodiments of the present disclosure is shown in FIG. 9. Exemplary modulation system 900 can comprise a control device 910, an adjustable voltage source 920, and a modulator 930. Modulator 930 can receive an incident radiation, such as from a $CO_2$ infrared laser, and outputs radiation in which one or more wavelengths (e.g., one or more mid-IR wavelengths) have been modulated in intensity, phase, and/or polarization. Modulator 930 can comprise, for example, an aperture reflect-array antenna with a graphene mesh layer such as shown in FIG. 6. Source 920 provides a single output voltage for controlling modulator 930. Control device 910 can instruct source 920 to output a particular voltage level corresponding to the intensity, phase, and/or polarization modulation desired for one or more wavelengths of the radiation incident to modulator 930. This can be performed in various ways including, for example, by accessing doping response information corresponding to the wavelength(s) to be modulated that can be stored in memory of control device 910, e.g., in a lookup table. For example, the doping response information may comprise one or more settings for voltage source 920 corresponding to the graphene doping required to effect a desired range of amplitude and/or phase modulations for each of the mid-IR wavelengths of interest. In some exemplary embodiments of the present disclosure, the doping response information may comprise sampled versions of one or more of the intensity, phase, and polarization versus wavelength for the particular antenna comprising modulator 930 such as, for example, intensity and phase graphs shown in FIGS. 5(b) and 5(c).

Figure 12:
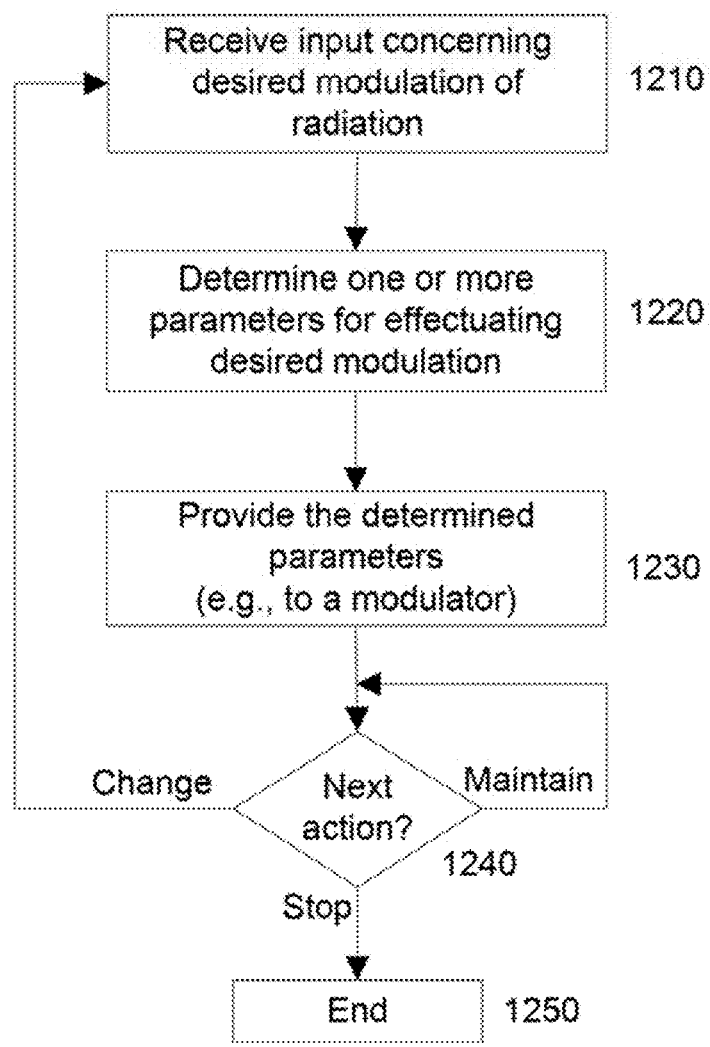
FIG. 12 is a flow diagram of an exemplary method for controlling modulation of intensity, phase, and/or polarization of radiation by a modulator, according to one or more embodiments of the present disclosure.

FIG. 12 is a flow diagram of an exemplary method for controlling modulation of intensity, phase, and/or polarization of radiation (e.g., mid-IR radiation) by a modulator, such as modulator 930 comprising an aperture reflect-array antenna with a graphene mesh layer described above with reference to FIG. 9. The exemplary method shown in FIG. 12 may be performed by a control device, such as control device 910 described above with reference to FIG. 9. Although the exemplary method is illustrated in FIG. 12 by blocks in a particular order, this order is merely exemplary and the steps/procedures of the method may be performed in a different order than shown by FIG. 12, and may be combined and/or divided into blocks having different functionality.

For example, as shown in FIG. 12, in block 1210, the control device can receive input indicating the desired modulation of intensity, phase, and/or polarization of radiation (e.g., mid-IR radiation). The range of radiation to be modulated may comprise a single wavelength or a range of wavelengths. In some exemplary embodiments of the present disclosure, the desired intensity modulation may comprise a binary ("on"/"off") value. In some exemplary embodiments of the present disclosure, the desired phase modulation may comprise a value between $-\pi$ and $\pi$ radians. In block 1220, the control device can determine one or more parameters for effectuating the desired modulation. This can be performed in various ways including, for example, by accessing doping response information corresponding to one or more wavelength(s) to be modulated. As discussed above, the doping response information may comprise information that can be used to determine one or more parameters (e.g., settings) for an adjustable voltage source whose output controls the doping of the graphene mesh layer as required to effectuate the desired modulation. In block 1230, the control device provides the one or more parameters determined in block 1220, e.g., by sending a message comprising the one or more parameters to an adjustable voltage source or a modulator. In block 1240, the control device can determine the next action required. If a change in modulation is required (e.g., new input received), the process returns to block 1210. If the current modulation is to be maintained, the process can loop back to the input of block 1240. If the control device determines that the modulation is to be terminated, it can proceed to block 1250 where the process ends.

Figure 10:
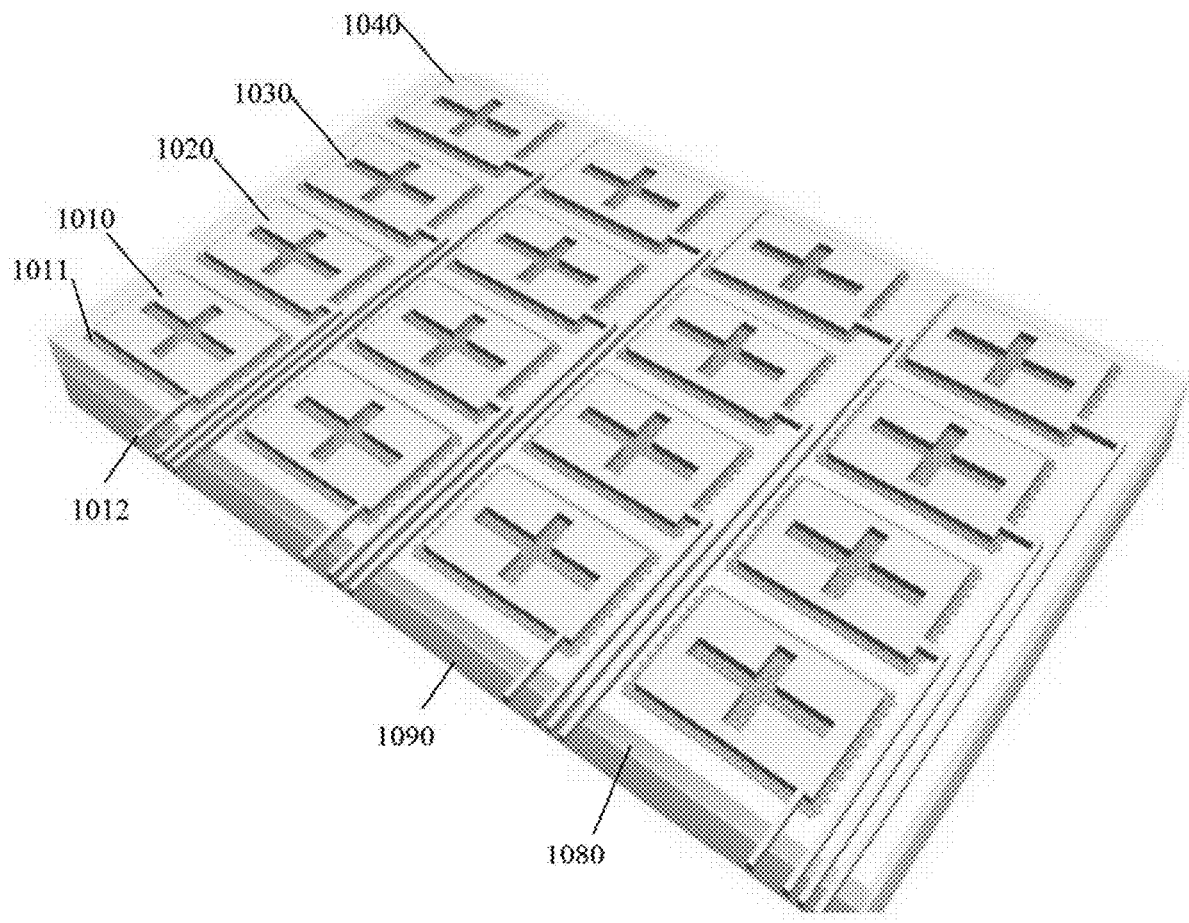
FIG. 10 is a perspective view of an exemplary an exemplary mid-IR spatial light modulator comprising an reflect-array of metallic aperture antennas according to one or more exemplary embodiments of the present disclosure.

In other embodiments, binary-intensity (i.e., on/off) SLMs can be created by using arrays of aperture antennas individually addressable by electronics. FIG. 10 shows an exemplary SLM created from an array of metallic aperture antennas (identified by representative elements 1010-1040). Each metallic aperture section (e.g., element 1010) is disposed in contact with a graphene mesh section (e.g., element 1011) that is isolated from graphene mesh sections in contact with other metallic aperture section (e.g., antenna 1020). Similar to the arrangement of FIG. 6(a), the mesh sections are disposed on a $SiO_2$ layer 1080, which is disposed on a gold (Au) substrate 1090. Moreover, each metallic section is connected to an individual control line (e.g., element 1012) such that the voltage between each metallic section (e.g., element 1010) and substrate 1090 can be adjusted independently of the voltage applied to other antenna sections (e.g., element 1020). In this exemplary manner, spatial dependent modulation of radiation (e.g., mid-IR wavelengths) can be achieved by adjusting the doping of each graphene mesh section according to the principles discussed herein. A binary-intensity SLM constructed according to these principles will exhibit a fast frame rate because the RC time constant of individual antennas can be very small (e.g., a few tens of ps) allowing for fast switching. SLMs based on antennas with sub-wavelength footprints will have high spatial resolution, which facilitates control of not only far-field but also optical near-field and meso-field. A binary-intensity SLM constructed according to these principles can be configured into a binary hologram to synthesize complex 3D light fields (see, e.g., Refs. [47]-[48]).

Figure 11:
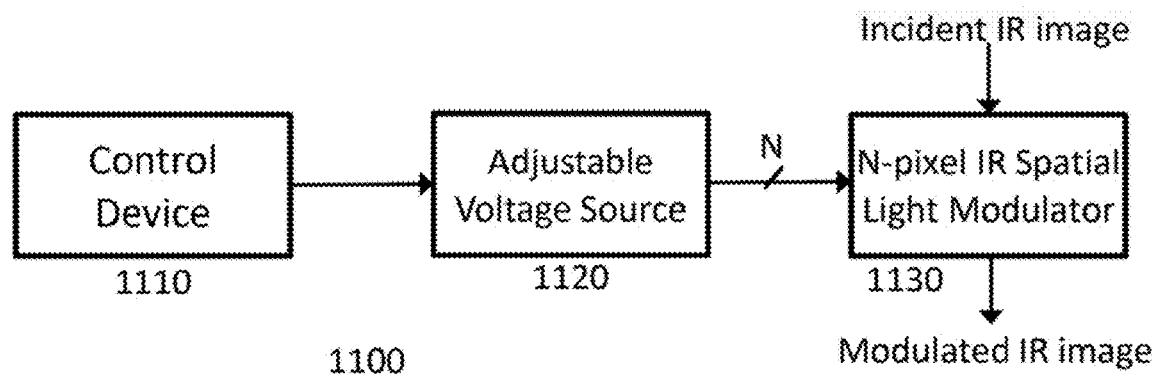
FIG. 11 is a block diagram of the exemplary mid-IR spatial light modulation (SLM) system according to one or more further exemplary embodiments of the present disclosure.

A block diagram of an exemplary spatial light modulation (SLM) system 1100 according to one or more further exemplary embodiments of the present disclosure is shown in FIG. 11. SLM system 1100 comprises a control device 1110, an adjustable voltage source 1120, and a N-pixel SLM 1130. For example, as shown in FIG. 11, SLM 1130 receives incident radiation, including an N-pixel image, and outputs an N-pixel image for which one or more wavelengths (e.g., mid-IR wavelengths) of one or more of the N pixels has been modulated in amplitude, phase, and/or polarization. SLM 1130 may comprise, for example, an aperture reflect-array antenna such as shown in FIG. 10. Source 1120 provides N independent output voltages corresponding to each of the N pixels that SLM 1130 is capable of modulating. For each of the N pixels in each frame of the output image, control device 1110 instructs source 1120 to output a particular voltage corresponding to the amplitude and/or phase modulation desired for that pixel. This can be performed in various ways including, for example, by accessing doping response information that can be stored in memory of control device 1110, e.g., in a lookup table. For example, the doping response information may comprise one or more settings for voltage source 1120 corresponding to the graphene doping required to effect a desired range of amplitude, phase, and/or intensity modulations for one or more wavelengths of interest. In some exemplary embodiments of the present disclosure, the doping response information may comprise sampled versions of one or more of the intensity, phase, and polarization versus wavelength for the particular antenna comprising SLM 1130 such as, for example, the exemplary intensity and phase graphs shown in FIGS. 5(*b*) and 5(*c*).

Figure 13:
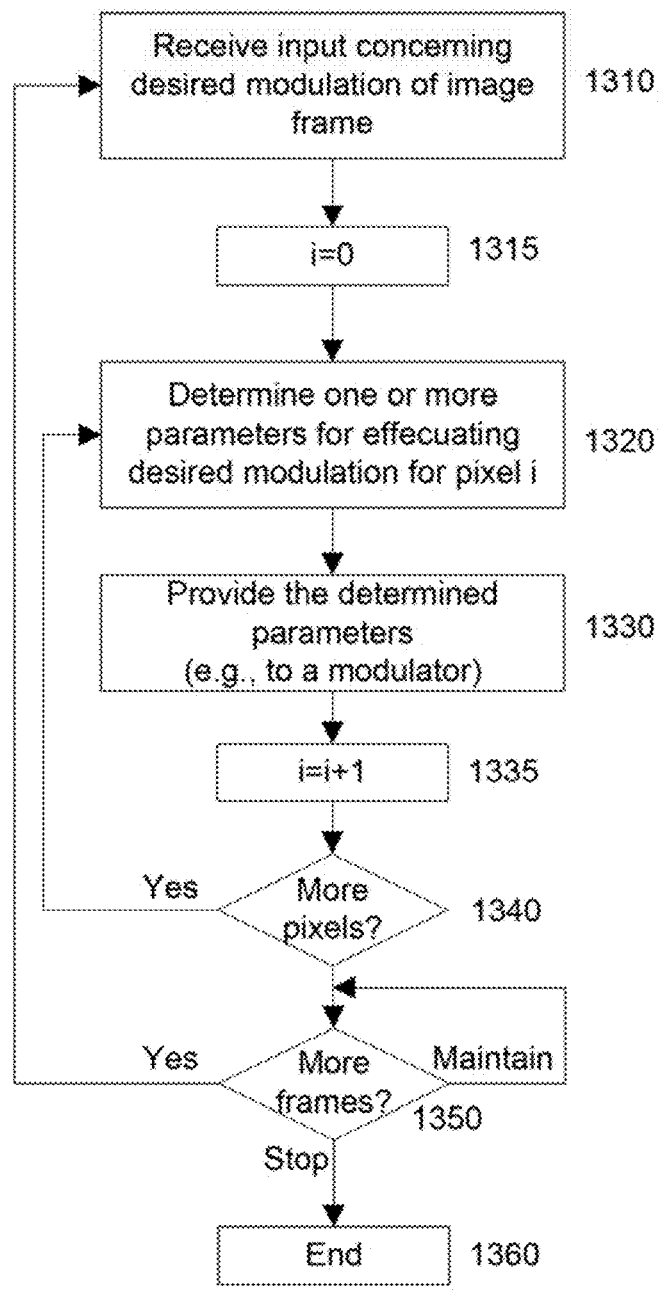
FIG. 13 is a flow diagram of an exemplary method for controlling modulation of intensity, phase, and/or polarization of radiation by a spatial light modulator (SLM), according to one or more exemplary embodiments of the present disclosure.

FIG. 13 is a flow diagram of an exemplary method for controlling modulation of intensity, phase, and/or polarization of radiation (e.g., mid-IR radiation) by a spatial light modulator (SLM), such as SLM 1130 comprising an aperture reflect-array antenna with a graphene mesh layer described above with reference to FIG. 11. The exemplary method shown in FIG. 13 may be performed by a control device, such as control device 1110 described above with reference to FIG. 11. Although the exemplary method is illustrated in FIG. 13 by blocks in a particular order, this order is merely exemplary and the steps/procedures of the method may be performed in a different order than shown by FIG. 13, and may be combined and/or divided into blocks having different functionality.

In block 1310, the control device can receive input indicating the desired modulation of intensity, phase, and/or polarization of radiation (e.g., mid-IR radiation) for each of the N pixels in an incident image frame. The range of radiation to be modulated may comprise a single wavelength or a range of wavelengths. In some exemplary embodiments of the present disclosure, the desired intensity modulation for each of the N pixels may comprise a binary ("on"/"off") value, while in other embodiments the intensity may comprise an attenuation amount (e.g., % or dB of maximum). In some exemplary embodiments of the present disclosure, the desired phase modulation may comprise a value between $-\pi$ and $\pi$ radians for each of the N pixels. In block 1315, the control device can initialize the pixel counter, i, to zero. In block 1320, the control device can determine the necessary parameters for effectuating the desired modulation for pixel i. This can be performed in various ways including, for example, by accessing doping response information corresponding to one or more wavelength(s) to be modulated. As discussed above, the doping response information may comprise information that can be used to determine one or more parameters (e.g., settings) for an adjustable voltage source whose output controls the doping of the graphene mesh layer as required to effectuate the desired modulation. In block 1330, the control device provides the one or more parameters determined in block 1320 for pixel i, e.g., by sending a message comprising the one or more parameters to an adjustable voltage source or a modulator. The control device can increment the pixel counter, i, in block 1335 and can determine in block 1340 if additional pixels need to be modulated. If so, the process returns to block 1320. If not, the process can proceed to block 1350 where the control device can determine the next action preferred or required. If a new image frame is available to be modulated, the process returns to block 1310. If the current modulation is to be maintained, the process can loop back to the input of block 1350. If the control device determines that the modulation is to be terminated, it can proceed to block 1360 where the process ends.

Figure 5:
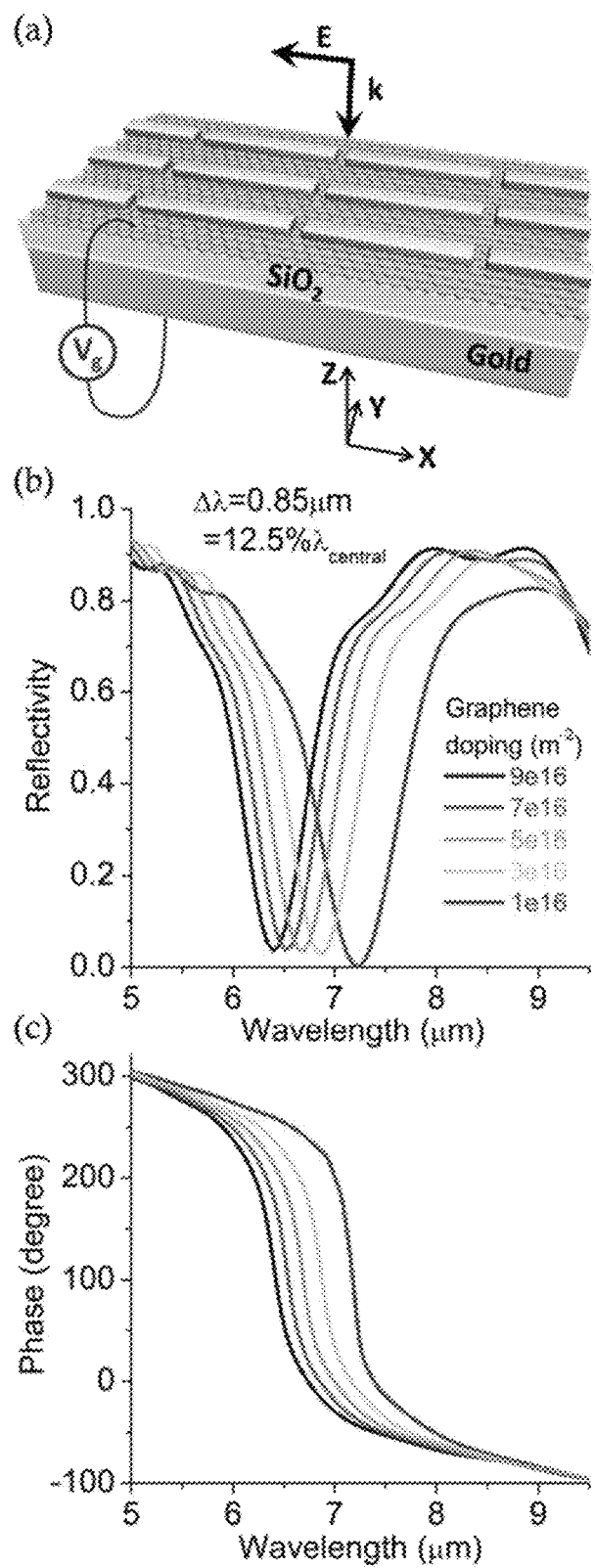
FIG. 5(a) is an illustration of an electrically-tunable reflect array of metallic rod antennas loaded having the graphene pattern on $SiO_2$—Au substrate according to one or more embodiments of the present disclosure.
FIGS. 5(b) and 5(c) are exemplary graphs of the exemplary reflective intensity and phase, respectively, at particular mid-IR wavelengths of the exemplary antenna reflect-array shown in FIG. 5(a) at different graphene doping levels.
Figure 6:
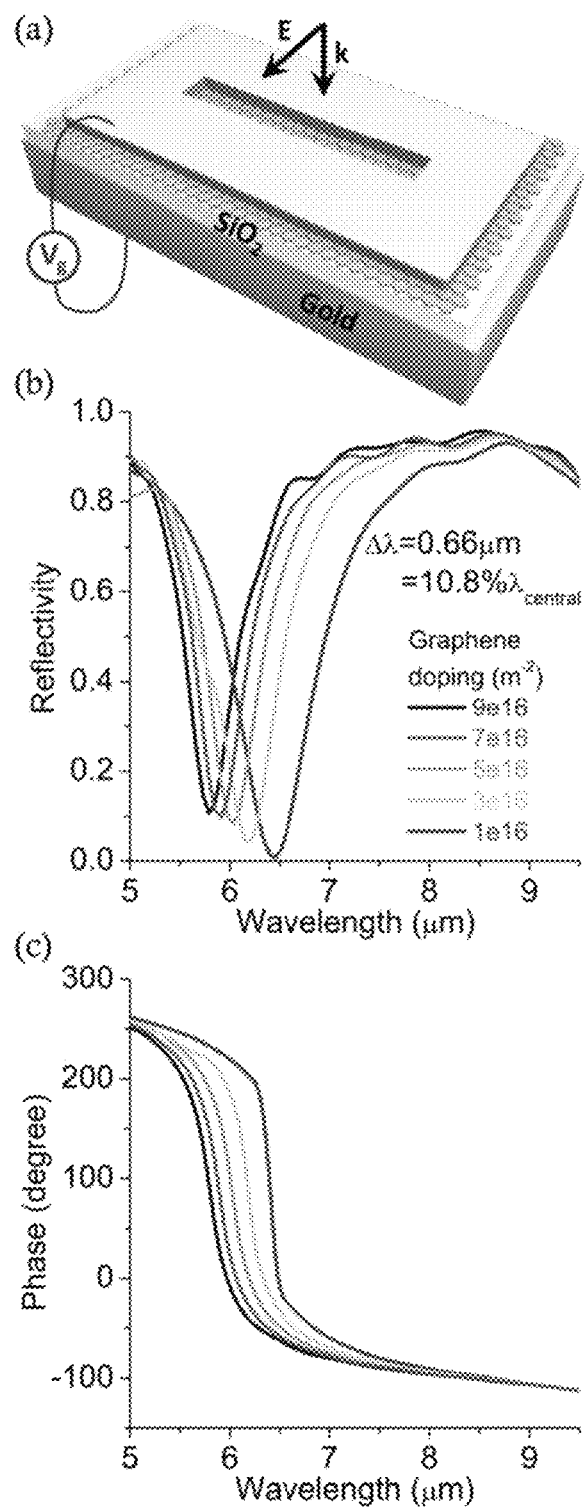
FIG. 6(a) is an illustration of an electrically-tunable aperture reflect array loaded having the graphene pattern on SiO$_2$—Au substrate according to one or more embodiments of the present disclosure.
FIGS. 6(b) and 6(c) are exemplary graphs of the exemplary reflective intensity and phase, respectively, at particular mid-IR wavelengths of the antenna reflect-array shown in FIG. 6(a) at different graphene doping levels.

As shown in the exemplary graphs of FIGS. 5(*c*) and 6(*c*), the phase tuning range of the reflect-array designs of FIGS. 5(*a*) and 6(*a*) can be up to ~240 degrees, which may be insufficient for applications requiring full phase control of optical wavefronts. Nevertheless, more complex structures that support two or multiple antenna resonances such as V-antennas (see, e.g., Refs. [23]-[27] and [29]) and concentric loop antennas (see, e.g., Ref. [28]) can extend the phase response to potentially cover the entire $2\pi$ range. To realize full analog-phase SLMs, for example, array elements with large phase modulation and small variations in scattering amplitude can be utilized. Antenna structures with multiple resonances can provide additional degrees of freedom in optical design and reduce the correlation between phase and amplitude response. For example, large phase variations with minimal changes in scattering amplitude have been demonstrated in V-antennas (see, e.g., Refs. [23]-[27] and [29]).

Although exemplary embodiments are disclosed herein as using graphene, the person of ordinary skill will readily understand that graphene is merely an exemplary material and many other such materials may be used advantageously. For example, electrically-tunable, thin-film materials such as vanadium dioxide, boron nitride, and molybdenum disulfide may be combined with metal in a plasmonic antenna according to various exemplary embodiments of the present disclosure.

Moreover, although embodiments disclosed herein (e.g., embodiments illustrated by FIGS. 2, 4-8, 10, 15 and 16) are described as having a metallic layer disposed on top of a graphene (or other thin-film material) layer, which in turn can be disposed on top of a substrate or dielectric, persons of ordinary skill will recognize that the order of the metallic and graphene layers may be reversed in other exemplary embodiments. In other words, a graphene layer can be disposed advantageously on top of a metallic layer, which in turn can be disposed advantageously on top of a substrate or dielectric.

Figure 14:
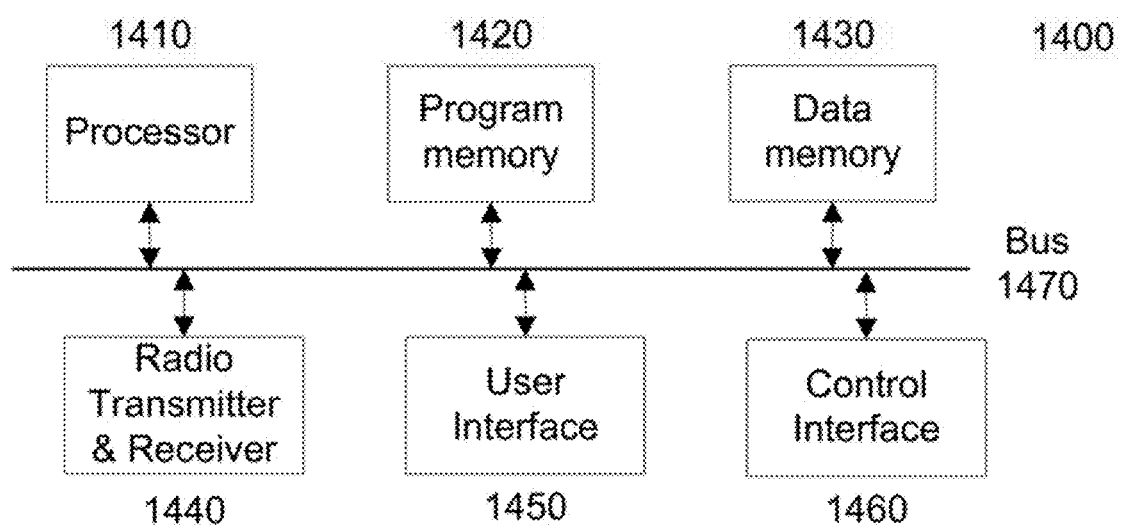
FIG. 14 is a block diagram of an exemplary control device according to one or more exemplary embodiments of the present disclosure.

FIG. 14 shows a block diagram of an exemplary control device or apparatus utilizing certain embodiments of the present disclosure, including execution of instructions comprising the computer-readable medium that causes modulation of mid-IR radiation according to one or more of the embodiments described herein above. For example, a device 1400 may be used as control device 910 and/or control device 1110 shown in FIGS. 9 and 11, respectively. Exemplary device 1400 can comprise a processor 1410 that can be operably connected to a program memory 1420 and/or a data memory 1430 via a bus 1470 that may comprise parallel address and data buses, serial ports, or other methods and/or structures known to those of ordinary skill in the art. Program memory 1420 comprises software code or program executed by processor 1410 that facilitates, causes and/or programs exemplary device 1400 to communicate using one or more wired or wireless communication protocols, including one or more wireless communication protocols standardized by 3GPP, 3GPP2, or IEEE, such as those commonly known as LTE, UMTS, HSPA, GSM, GPRS, EDGE, 1xRTT, CDMA2000, 802.11, WiFi, HDMI, USB, Firewire, etc., or any other protocols utilized in conjunction with radio transceiver 1440, user interface 1450, and/or host interface 1460.

Program memory 1420 can also comprises software code executed by processor 1410 to control the functions of device 1400, including configuring and controlling various components such as radio transceiver 1440, user interface 1450, and/or host interface 1460. Program memory 1420 may also comprise an application program that causes modulation of mid-IR radiation according to one or more of the embodiments described herein. Such software code may be specified or written using any known or future developed programming language, such as e.g. Java, C++, C, Objective C, HTML, XHTML, and Assembler, as long as the desired functionality, e.g., as defined by the implemented method steps, is preserved. In addition or alternatively, program memory 1420 may comprise an external storage arrangement (not shown) remote from device 1400, from which the instructions can be downloaded into program memory 1420 located within or removably coupled to device 1400, so as to enable execution of such instructions.

Data memory 1430 may comprise memory area for processor 1410 to store variables used in protocols, configuration, control, and other functions of device 1400, including modulating mid-IR radiation according to one or more of the embodiments described herein. For example, data memory 1430 may include the doping response information (e.g., lookup tables) described above with reference to FIGS. 9 and 11. Moreover, program memory 1420 and/or data memory 1430 may comprise non-volatile memory (e.g., flash memory), volatile memory (e.g., static or dynamic RAM), or a combination thereof. Furthermore, data memory 1430 may comprise a memory slot by which removable memory cards in one or more formats (e.g., SD Card, Memory Stick, Compact Flash, etc.) may be inserted and removed. Persons of ordinary skill in the art will recognize that processor 1410 may comprise multiple individual processors (e.g., multi-core processors), each of which implements a portion of the functionality described above. In such case, multiple individual processors may be commonly connected to program memory 1420 and data memory 1430 or individually connected to multiple individual program memories and or data memories. More generally, persons of ordinary skill in the art will recognize that various protocols and other functions of device 1400 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio transceiver 1440 may comprise radio-frequency transmitter and/or receiver functionality that enables device 1400 to communicate with other equipment supporting like wireless communication standards. In an exemplary embodiment, radio transceiver 1440 includes an LTE transmitter and receiver that enable device 1400 to communicate with various Long Term Evolution (LTE) networks (also known as "4G") according to standards promulgated by 3GPP. In some exemplary embodiments of the present disclosure, radio transceiver 1440 includes circuitry, firmware, etc. necessary for device 1400 to communicate with various UMTS and/or GSM/EDGE networks, also according to 3GPP standards. In some exemplary embodiments of the present disclosure, radio transceiver 1440 includes circuitry, firmware, etc. necessary for device 1400 to communicate with various CDMA2000 networks, according to 3GPP2 standards. In some exemplary embodiments of the present disclosure, radio transceiver 1440 is capable of communicating using radio technologies that operate in unlicensed frequency bands, such as IEEE 802.11 WiFi that operates using frequencies in the regions of 2.4 and/or 5.6 GHz. In some exemplary embodiments of the present disclosure, radio transceiver 1440 may comprise a transceiver that is capable of wired communication, such as by using IEEE 802.3 Ethernet technology. The functionality particular to each of these embodiments may be coupled with or controlled by other circuitry in device 1400, such as processor 1410 executing protocol program code stored in program memory 1420.

User interface 1450 may take various forms depending on the particular embodiment of device 1400. In some exemplary embodiments of the present disclosure, user interface 1450 may comprise a microphone, a loudspeaker, slidable buttons, depressable buttons, a display, a touchscreen display, a mechanical or virtual keypad, a mechanical or virtual keyboard, and/or any other user-interface features commonly found on mobile phones. In other embodiments, device 1400 may comprise a tablet computing device (such as an iPad® sold by Apple, Inc.) including a larger touch-screen display. In such embodiments, one or more of the mechanical features of user interface 1450 may be replaced by comparable or functionally equivalent virtual user interface features (e.g., virtual keypad, virtual buttons, etc.) implemented using the touchscreen display, as familiar to persons of ordinary skill in the art. In other embodiments, device 1400 may be a digital computing device, such as a laptop computer, desktop computer, workstation, etc. that comprises a mechanical keyboard that may be integrated, detached, or detachable depending on the particular embodiment. Such a digital computing device may also comprise a touch screen display. Many exemplary embodiments of device 1400 having a touch screen display are capable of receiving the user inputs, e.g., related to controlling modulation of radiation incident on an antenna, according to various exemplary embodiments described herein.

In some exemplary embodiments of the present disclosure, device 1400 may comprise an orientation sensor, which can be used to sense when the user has changed the physical orientation of the device 1400's touch screen display. An indication signal from the orientation sensor may be available to any application program executing on device 1400, such that an application program may change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device.

Control interface 1460 of device 1400 may take various forms depending on the particular embodiment of device 1400 and of the particular interface requirements of the hardware under control of device 1400 including adjustable voltage sources (e.g., sources 920 and 1140 shown in FIGS. 9 and 11, respectively) used to vary the graphene doping level for modulating mid-IR radiation according to embodiments described herein. For example, control interface 1460 may comprise an RS-232 interface, an RS-485 interface, a USB interface, an HDMI interface, a Bluetooth interface, or the like. In some exemplary embodiments of the present disclosure, control interface 1460 may comprise an IEEE 802.3 Ethernet interface such as described above. In some exemplary embodiments of the present disclosure, control interface 1460 may comprise analog interface circuitry including, for example, one or more digital-to-analog (D/A) and/or analog-to-digital (A/D) converters.

Persons of ordinary skill in the art will recognize the above list of features, interfaces, and radio-frequency communication standards is merely exemplary and not limiting to the scope of the present disclosure. In other words, device 1400 may comprise more functionality than is shown in FIG. 14 including, for example, a video and/or still-image camera, microphone, media player, etc. Moreover, radio transceiver 1440 may include circuitry necessary to communicate using additional radio-frequency communication standards including Bluetooth, GPS, and/or others. Accordingly, processor 1410 may execute software code stored in program memory 1420 to control such additional functionality.

As described herein, a device or apparatus may be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. A device or apparatus may be regarded as a device or apparatus, or as an assembly of multiple devices and/or apparatuses, whether functionally in cooperation with or independently of each other. Moreover, devices and apparatuses may be implemented in a distributed fashion throughout a system, so long as the functionality of the device or apparatus is preserved. Such and similar principles are considered as known to a skilled person.

In summary, exemplary designs of electrically-tunable graphene-metal plasmonic antennas according to exemplary embodiments of the present disclosure can be provided, which can be used for building mid-IR reconfigurable flat optical components. This can be advantageous over conventional devices, such as providing a reduction in size and weight, elimination of movable parts and exotic materials, and increased design freedom in engineering near-field and meso-field. Flat components comprising arrays of phased elements have achieved considerable success in other spectral range, examples including liquid-crystal spatial light modulators for visible light (see, e.g., Ref [49]) and microwave active phased array radar (see, e.g., Ref. [50]). It is likely that flat optical components may also have a significant impact in the mid-IR spectral range and lead to unique and important applications. For example, mid-IR modulators can facilitate communication, navigation, and surveillance through scattering media (e.g., foggy or dusty environments); mid-IR beam-steering devices with large scan angles and fast scanning rate, and without movable components will be of primary importance to remote-sensing LIDAR systems.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, e.g., data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCES

The following references are hereby incorporated by reference in their entireties:

[1] B. H. Stuart, Infrared Spectroscopy: Fundamentals and Applications, Wiley, 2004
[2] R. F. Curl, F. Capasso, C. Gmachl, A. A. Kosterev, B. McManus, R. Lewicki, M. Pusharsky, G. Wysocki, and F. K. Tittel, Chem. Phys. Lett. 487, 1 (2010).
[3] A. M. Tabirian, D. P. Stanley, D. E. Roberts, and A. B. Thompson, Proc. of SPIE 6951, 69510T (2008).
[4] C. Bethea, F. Capasso, C. Gmachl, R. Paiella, E. A. Whittaker, H. Y. Hwang, D. L. Sivco, J. N. Baillargeon, and A. Y. Cho, Electron. Lett. 38, 181 (2002).
[5] A. A. Kosterev, F. K. Tittel, R. Köhler, C. Gmachl, F. Capasso, D. L. Sivco, A. Y. Cho, S. Wehe, and M. G. Allen, Appl. Opt. 41, 1169 (2002).
[6] H. H. P. T. Bekman, J. C. van den Heuvel, F. J. M. van Putten, and R. Schleijpen, Proc. SPIE 5615, 27 (2004).
[7] D. C. Fernandez, R. Bhargava, S. M. Hewitt, and I. W. Levin, Nature Biotech. 23, 469 (2005).
[8] C. Bauer, P. Geiser, J. Burgmeier, G. Holl, W. Schadel, Appl. Phys. B 85, 251 (2006).
[9] A. P. M. Michel, P. Q. Liu, J. K. Yeung, P. Corrigan, M. L. Baeck, Z. Wang, T. Day, F. Moshary, C. F. Gmachl, and J. A. Smith, Opt. Eng. 49, 111125 (2010).
[10] Y. Yao, A. J. Hoffman, and C. F. Gmachl, Nature Photon. 6, 432 (2012).
[11] A. Rogalski, Infrared Phys. Technol. 54, 136 (2011).
[12] S. D. Gunapala, S. V. Bandara, J. K. Liu, J. M. Mumolo, D. Z. Ting, C. J. Hill, J. Nguyen, B. Simolon, J. Woolaway, S. C. Wang, W. Li, P. D. LeVan, and M. Z. Tidrow, Infrared Phys. Technol. 52, 395 (2009).
[13] A. Rogalski, Prog. Quant. Electron. 36, 342 (2012).
[14] S.-H. Shim, D. B. Strasfeld, E. C. Fulmer, and M. T. Zanni, Opt. Lett. 31, 838 (2006).
[15] P. Holmstrom, IEEE J. Quant. Electron. 37, 1273 (2001).
[16] A. Lyakh, R. Maulini, A. Tsekoun, R. Go, and C. K. N. Patel, Appl. Phys. Lett. 92, 211108 (2008).
[17] J. Teissier, S. Laurent, C. Sirtori, H. Debregeas-Sillard, F. Lelarge, F. Brillouet, and R. Colombelli, Appl. Phys. Lett. 94, 211105 (2009).
[18] F. H. L. Koppens, D. E. Chang, and F. Javier Garcia de Abajo, Nano Lett. 11, 3370 (2011).
[19] Z. Fei, A. S. Rodin, G. O. Andreev, W. Bao, A. S. McLeod, M. Wagner, L. M. Zhang, Z. Zhao, M. Thiemens, G. Dominguez, M. M. Fogler, A. H. Castro Neto, C. N. Lau, F. Keilmann, and D. N. Basov, Nature 487, 82 (2012).
[20] J. Chen, M. Badioli, P. Alonso-Gonzalez, S. Thongrattanasiri, F. Huth, J. Osmond, M. Spasenović, A. Centeno, A. Pesquera, P. Godignon, A. Z. Elorza, N. Camara, F. Javier García de Abajo, R. Hillenbrand, and F. H. L. Koppens, Nature 487, 77 (2012).
[21] P. Bharadwaj, B. Deutsch, and L. Novotny, Adv. Opt. Photon. 1, 438 (2009).
[22] L. Novotny, and N. van Hulst, Nature Photon. 5, 83 (2011).
[23] N. Yu, P. Genevet, M. A. Kats, J.-P. Tetienne, F. Aieta, F. Capasso, and Z. Gaburro, Science 334, 333 (2011).
[24] P. Genevet, N. Yu, F. Aieta, J. Lin, M. A. Kats, R. Blanchard, M. O. Scully, Z. Gaburro, and F. Capasso, Appl. Phys. Lett. 100, 13101 (2012).
[25] M. A. Kats, P. Genevet, G. Aoust, N. Yu, R. Blanchard, F. Aieta, Z. Gaburro, and F. Capasso, Proc. Nat. Acad. Sci. U.S.A. 109, 12364 (2012).
[26] F. Aieta, P. Genevet, M. A. Kats, N. Yu, R. Blanchard, Z. Gaburro, and F. Capasso, Nano Lett. 12, 4932 (2012).
[27] N. Yu, F. Aieta, P. Genevet, M. A. Kats, Z. Gaburro, and F. Capasso, Nano Lett. 12, 6328 (2012).

[28] B. Memarzadeh, and H. Mosallaei, Opt. Lett. 36, 2569 (2011).
[29] X. Ni, N. K. Emani, A. V. Kildishev, A. Boltasseva, and V. M. Shalaev, Science 335, 427 (2012).
[30] S. Sun, Q. He, S. Xiao, Q. Xu, X. Li, and L. Zhou, Nature Mater. 11, 426 (2012).
[31] S. Sun, K.-Y. Yang, C.-M. Wang, T.-K. Juan, W. T. Chen, C. Y. Liao, Q. He, S. Xiao, W.-T. Kung, G.-Y. Guo, L. Zhou, and D. P. Tsai, Nano Lett. 12, 6223 (2012).
[32] M. Kang, T. Feng, H.-T. Wang, and J. Li, Optics Exp. 20, 15882 (2012).
[33] L. Huang, X. Chen, H. Mühlenbernd, G. Li, B. Bai, Q. Tan, G. Jin, T. Zentgraf, and S. Zhang, Nano Lett. 12, 5750 (2012).
[34] K. S. Novoselov, A. K. Geim, S. V. Morozov, D. Jiang, Y. Zhang, S. V. Dubonos, I. V. Grigorieva, and A. A. Firsov, Science 306, 666 (2004).
[35] J. A. Kong, Electromagnetic Wave Theory, EMW Publishing, Cambridge, 2000.
[36] L. A. Falkovsky, and S. S. Pershoguba, Phys. Rev. B 76, 153410 (2007).
[37] N. Petrone, C. R. Dean, I. Meric, A. M. van der Zande, P. Y. Huang, L. Wang, D. Muller, K. L. Shepard, and J. Hone, Nano Lett. 12, 2751 (2012).
[38] A. Alù, and N. Engheta, Nature Photon. 2, 307 (2008).
[39] A. Alù, and N. Engheta, Phys. Rev. Lett. 101, 043901 (2008).
[40] Y. Yao, M. A. Kats, P. Gevenet, N. Yu, Y. Song, J. Kong, and F. Capasso (submitted to Nano Letters).
[41] P. A. Kossyrev, A. Yin, S. G. Cloutier, D. A. Cardimona, D. Huang, P. M. Alsing, and J. M. Xu, Nano Lett. 5, 1978 (2005).
[42] J. Kim, H. Son, D. J. Cho, B. Geng, W. Regan, S. Shi, K. Kim, A. Zettl, Y.-R. Shen, and F. Wang, Nano Lett. 12, 5598 (2012).
[43] N. K. Emani, T.-F. Chung, X. Ni, A. V. Kildishev, Y. P. Chen, and A. Boltasseva, Nano Lett. 12, 5202 (2012).
[44] M. Jablan, H. Buljan, and M. Soljačić, Phys. Rev. B 80, 245435 (2009).
[45] W. Gao, J. Shu, C. Qiu, and Q. Xu, ACS Nano 9, 7806 (2012)
[46] D. M. Pozar, S. D. Targonski, H. D. Syrigos, IEEE Trans. Antenn. Propag. 45, 287 (1997).
[47] Ulusoy, L. Onural, and H. M. Ozaktas, J. Opt. Soc. Am. A 28, 1211 (2011).
[48] W.-H. Lee, Appl. Opt. 18, 3661 (1979).
[49] D. Casasent, Proc. IEEE 65, 143 (1977).
[50] D. Parker, and D. C. Zimmermann, IEEE Trans. Microw. Theory Tech. 50, 678 (2002).

What is claimed is:

1. A planar antenna for radiation, comprising:
a semiconductor first layer;
an insulator second layer disposed in contact with the semiconductor layer;
a third layer provided in contact with the insulator layer, the third layer comprising one or more sections of a tunable thin-film material; and
a metallic fourth layer comprising one or more metallic sections, wherein each metallic section is provided in contact with at least one of the one or more sections of the tunable thin-film material and comprises at least one gap, and wherein at least one dimension of the at least one gap is related to at least one wavelength of the radiation,
wherein the third layer has an area that is directly below and extends along an entire width of at least one of the metallic sections, and wherein the insulator second layer isolates the third layer from the semiconductor first layer along the entirety of the area.

2. The antenna of claim 1, wherein the tunable thin-film material comprises at least one of vanadium dioxide, boron nitride or molybdenum disulfide.

3. The antenna of claim 1, wherein the metallic fourth layer comprises a plurality of rods arranged in a plurality of shapes, with nanoscale gaps in at least one dimension between adjacent shapes.

4. The antenna of claim 1, wherein the radiation comprises a mid-infrared ("mid-IR") radiation.

5. The antenna of claim 1, wherein the metallic fourth layer comprises one or more apertures having at least one dimension less than the at least one wavelength of the radiation.

6. The antenna of claim 5, wherein shapes of the one or more apertures comprises one or more of a rectangle, a cross, a bowtie, a "T", an "H", or a spiral.

7. The antenna of claim 1, wherein the tunable thin-film material comprises grapheme.

8. The antenna of claim 1, wherein the insulator second layer completely isolates the third layer from the semiconductor first layer for an entire extension of the semiconductor first layer.

9. The antenna of claim 1, wherein a spacing between the metallic fourth layer and the insulator second layer is less than the at least one wavelength of the radiation.

10. The antenna of claim 1, further comprising one or more electrical connections for tuning a resonance of the antenna, wherein each of the one or more electrical connections is attached to at least one of the one or more metallic sections or to at least one of the one or more sections of the tunable thin-film material.

11. The antenna of claim 1, wherein the third layer covers an entire surface of the insulator second layer.

12. A system for modulating radiation, comprising:
a planar antenna comprising:
a semiconductor first layer,
an insulator second layer provided in contact with the semiconductor layer,
one or more sections of a tunable thin-film material provided in contact with the insulator second layer, wherein the tunable thin-film material comprises graphene, and
a metallic third layer comprising one or more metallic sections, wherein each metallic section is provided in contact with at least one of the one or more sections of the tunable thin-film material and comprises at least one gap, and wherein at least one dimension of the at least one gap is related to at least one wavelength of the radiation,
wherein a particular one of the one or more sections of the tunable thin-film materials has an area that is directly below and extends aloe an entire width of at least one of the metallic sections, and wherein the insulator second layer isolates the particular one of the one or more sections of the tunable thin-film materials from the semiconductor first layer along the entirety of the area;
an adjustable voltage source coupled to the one or more sections of the tunable thin-film material; and
a control device coupled to the adjustable voltage source and configured to:
receive input concerning a desired modulation of at least one wavelength of the radiation by the antenna, wherein the radiation is at least one of transmitted or reflected radiation;

determine one or more parameters of the adjustable voltage source that effectuate the desired modulation by varying a doping level of the one or more sections of the tunable thin-film material; and provide the determined one or more parameters to the adjustable voltage source.

13. The system of claim 12, the control device further comprising:

at least one processor; and a non-transitory, computer-readable medium comprising computer-executable instructions that, when executed by the at least one processor, cause the control device to receive the input, determine a setting, and send a control message.

14. The system of claim 13, wherein:

the computer-readable medium further comprises doping response information describing at least one of an intensity, a phase, or a polarization of one or more further wavelengths of the radiation for each of a plurality of doping levels of the one or more sections of the tunable thin-film material, and the control device is configured to determine the one or more parameters by accessing the doping response information.

15. The system of claim 12, wherein the tunable thin-film material further comprises at least one of vanadium dioxide, boron nitride, or molybdenum disulfide.

16. The system of claim 12, wherein the desired modulation comprises at least one of an intensity, a phase, or a polarization modulation of at least one wavelength of a mid-infrared ("mid-IR") radiation.

17. The system of claim 12, wherein the metallic layer comprises a plurality of rods arranged in a plurality of shapes, with nanoscale gaps in at least one dimension between adjacent shapes.

18. The system of claim 12, wherein the metallic layer comprises one or more apertures having at least one dimension less than the at least one wavelength of the radiation.

19. The system of claim 18, wherein shapes of the one or more apertures comprises one or more of a rectangle, a cross, a bowtie, a "T", or "H", and a spiral.

20. The system of claim 12, wherein the metallic layer comprises gold (Au).

21. The system of claim 12, wherein:

the adjustable voltage source is independently coupled to each of the one or more sections of the tunable thin-film material, and the control device is configured to determine one or more parameters that will vary the doping level of at least one of the one or more sections of the tunable thin-film material independently of the doping level of at least one other of the one or more sections of the tunable thin-film material.

22. The system of claim 21, wherein the control device is further configured to determine one or more parameters that vary the doping level of each of the one or more sections of the tunable thin-film material independently of the doping levels of all other of the one or more sections of the tunable thin-film material.

23. The system device of claim 21, wherein each of the one or more parameters is related to a voltage to be applied between one of the one or more sections of the tunable thin-film material and the semiconductor first layer.

24. The system of claim 12, wherein the insulator second layer completely isolates the one or more sections of the tunable thin film material from the semiconductor first layer for an entire extension of the semiconductor first layer.

25. The system of claim 12, wherein the one or more sections of the tunable thin-film material cover an entire surface of the insulator second layer.

* * * * *